US006992978B1

(12) United States Patent
Humblet et al.

(10) Patent No.: US 6,992,978 B1
(45) Date of Patent: Jan. 31, 2006

(54) METHOD AND SYSTEM FOR PATH PROTECTION IN A COMMUNICATIONS NETWORK

(75) Inventors: Pierre A. Humblet, Cambridge, MA (US); Bruce D. Miller, North Reading, MA (US); Raj Shanmugaraj, Groton, MA (US); Steven Sherry, Needham, MA (US); Peter B. Beaulieu, Plaistow, NH (US); Michael W. Fortuna, Fremont, NH (US); Michael C. Yip, Wellesley, MA (US); William Abraham, Windham, NH (US)

(73) Assignee: Alcatel Communications, Inc., Plano, TX (US)

( * ) Notice: Subject to any disclaimer, the term of this patent is extended or adjusted under 35 U.S.C. 154(b) by 0 days.

(21) Appl. No.: 09/324,454

(22) Filed: Jun. 2, 1999

(51) Int. Cl.
*H04J 11/06* (2006.01)
*H04J 3/14* (2006.01)

(52) U.S. Cl. ...................................... 370/228; 370/227

(58) Field of Classification Search ................ 370/216, 370/217, 218, 219, 220, 221, 222, 223, 225, 370/226, 227, 228, 241, 242, 244, 251; 714/1, 714/2

See application file for complete search history.

(56) References Cited

U.S. PATENT DOCUMENTS 4,956,835 A    9/1990  Grover .......................... 370/16

(Continued)

FOREIGN PATENT DOCUMENTS

EP    0 828 400 A1    8/1997
EP    0 836 344 A2    8/1997

OTHER PUBLICATIONS

Veitch, P., et al., "ATM Network Resilience," *IEEE Network*: The Magazine of Computer Communications, US, IEEE Inc., New York, 11(5): 26-33 (1997), XP 000699938.

(Continued)

*Primary Examiner*—Ajit Patel
(74) *Attorney, Agent, or Firm*—Hamilton, Brook, Smith & Reynolds, PC; Jessica W. Smith; V. Lawrence Sewell

(57) ABSTRACT

A system and method for fast and reliable failure notification and accelerated switchover for path protection in a communications network having several overlapping areas of nodes interconnected by communications links is described. Upon a failure event involving one of the communications links, a failure message is broadcast identifying the failed link, the broadcast being confined within the areas which include the failed link. A reliable transmission protocol is provided wherein at one or more of the nodes, a LAPD protocol unnumbered information frame containing the failure message is sent to connected nodes. The failure message is resent in another unnumbered information frame after a time interval unless an unnumbered acknowledgment frame containing or referencing the failure message is received from the connected node. A method of path protection includes establishing plural working paths through the nodes. For each working path, an associated protection path is precalculated. A priority is assigned to each working path and associated protection path. A protection path is precalculated for each area through which a particular working path traverses. Upon a failure event, working paths that include the failed link are switched to their respective protection paths. Higher priority protection paths can preempt lower priority paths that share at least one link. At each node, linked lists for protection path activation, working path deactivation and path preemption are implemented upon a failure event.

19 Claims, 15 Drawing Sheets

U.S. PATENT DOCUMENTS

| | | | |
|---|---|---|---|
| 5,093,824 A | 3/1992 | Coan et al. | 370/16 |
| 5,105,421 A * | 4/1992 | Gingell | 370/235 |
| 5,195,181 A * | 3/1993 | Bryant et al. | 395/200 |
| 5,235,599 A | 8/1993 | Nishimura et al. | 371/11.2 |
| 5,239,537 A * | 8/1993 | Sakauchi | 370/218 |
| 5,327,427 A | 7/1994 | Sandesara | 370/85.14 |
| 5,398,236 A * | 3/1995 | Hemmady et al. | 370/218 |
| 5,453,979 A * | 9/1995 | Schibler et al. | 370/395.32 |
| 5,504,744 A * | 4/1996 | Adams et al. | |
| 5,631,908 A * | 5/1997 | Saxe | 370/235 |
| 5,642,396 A | 6/1997 | Cowgill | |
| 5,781,320 A * | 7/1998 | Byers | 359/123 |
| 5,812,524 A | 9/1998 | Moran et al. | 370/228 |
| 5,842,111 A * | 11/1998 | Byers | 455/6.3 |
| 5,854,786 A * | 12/1998 | Henderson et al. | 370/335 |
| 6,049,523 A * | 4/2000 | Anderson et al. | 370/217 |
| 6,097,696 A * | 8/2000 | Doverspike | 370/216 |
| 6,122,759 A | 9/2000 | Ayanoglu et al. | |
| 6,144,633 A | 11/2000 | Ikeda et al. | |
| 6,215,763 B1 | 4/2001 | Doshi et al. | |
| 6,233,072 B1 | 5/2001 | Liu et al. | |
| 6,324,162 B1 * | 11/2001 | Chaudhuri | 370/225 |
| 6,400,681 B1 | 6/2002 | Bertin et al. | |
| 6,411,600 B1 * | 6/2002 | Kwak et al. | 370/225 |
| 6,542,461 B1 * | 4/2003 | Faye et al. | 370/225 |
| 6,671,819 B1 * | 12/2003 | Passman et al. | 714/4 |

OTHER PUBLICATIONS

Kawamura, R., et al., "Self-healing Virtual Path Architecture in ATM Networks," *IEEE Communications Magazine*, US, 33(9): 72-79 (1995), XP 000528012.

H. Fuhii and N. Yoshikai; Restoration Message Transfer Mechanism and Restoration Characteristics of Double-Search Self-Healing ATM Networks; IEEE J. Selected Areas in Comm.; vol. 12, No. 1, pp. 149-158; Jan. 1994.

R. Kawamura, K. Sato and I. Tokizawa; Self-Healing ATM Networks Based on Virtual Path Concept; IEEE J. Selected Areas in Comm.; vol. 12, No. 1, pp. 120-127; Jan. 1994.

K. Murakami and H.S. Kim; Virtual Path Routing for Survivable ATM Networks; IEEE Trans. on Networking; vol. 4, No. 1, pp. 22-39; 1996.

J. Anderson, B.T. Doshi, S. Dravida and P. Harshavardhana; Fast Restoration of ATM Networks; IEEE J. Selected Areas in Comm.; vol. 12, No. 1, pp. 128-138; Jan. 1994.

T.H. Wu and N. Yoshiker; ATM Transport and Network Integrity; Academic Press, 1997. Chapter 7, pp. 297-331 and the references on pp 332-334.

* cited by examiner

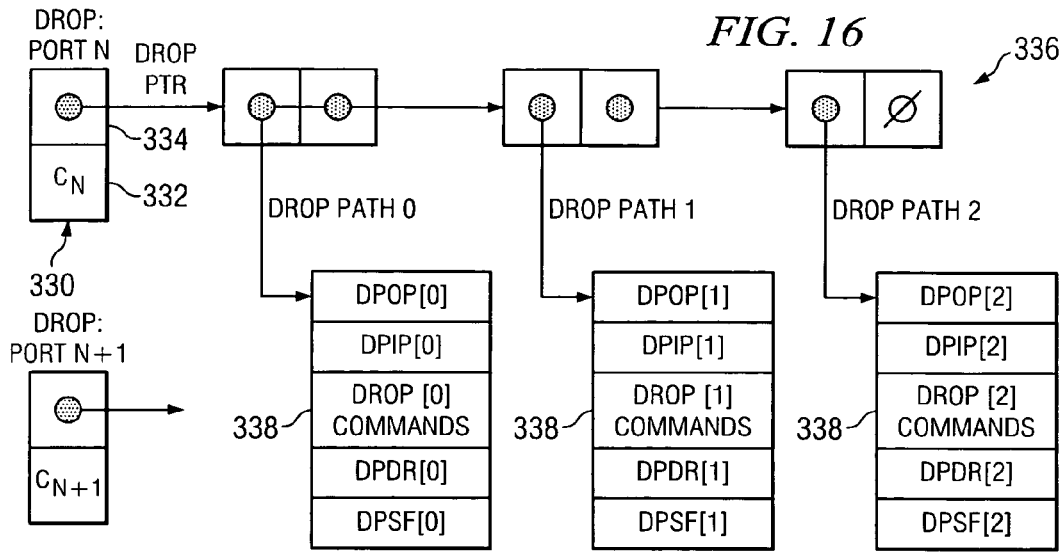

| | | |
|---|---|---|
| 0x000 | SPARE [15:0] | PORT 0 OUTPUT CAPACITY [15:0] |
| 0x004 | PORT 0 DROP POINTER [21:0] | |
| 0x008 | SPARE [15:0] | PORT 1 OUTPUT CAPACITY [15:0] |
| 0x00C | PORT 1 DROP POINTER [21:0] | |
| 0x010 | SPARE [15:0] | PORT 2 OUTPUT CAPACITY [15:0] |
| 0x014 | PORT 2 DROP POINTER [21:0] | |
| 0x018 | SPARE [15:0] | PORT 3 OUTPUT CAPACITY [15:0] |
| 0x01C | PORT 3 DROP POINTER [21:0] | |
| ⋮ | ⋮ | ⋮ |
| 0x1E0 | SPARE [15:0] | PORT 124 OUTPUT CAPACITY [15:0] |
| 0x1E4 | PORT 124 DROP POINTER [21:0] | |
| 0x1E8 | SPARE [15:0] | PORT 125 OUTPUT CAPACITY [15:0] |
| 0x1EC | PORT 125 DROP POINTER [21:0] | |
| 0x1F0 | SPARE [15:0] | PORT 126 OUTPUT CAPACITY [15:0] |
| 0x1F4 | PORT 126 DROP POINTER [21:0] | |
| 0x1F8 | SPARE [15:0] | PORT 127 OUTPUT CAPACITY [15:0] |
| 0x1FC | PORT 127 DROP POINTER [21:0] | |

METHOD AND SYSTEM FOR PATH PROTECTION IN A COMMUNICATIONS NETWORK

BACKGROUND

In communications networks, there are two types of mechanisms for handling network failures: protection and restoration. Protection usually denotes fast recovery (e.g., <50 ms) from a failure without accessing a central server or database or attempting to know the full topology of the network. Typically, protection can be achieved either by triggering a preplanned action or by running a very fast distributed algorithm. By contrast, restoration usually denotes a more leisurely process (e.g., minutes) of re-optimizing the network after having collected precise topology and traffic information.

Protection can occur at several different levels, including automatic protection switching, line switching and path switching. The most basic protection mechanism is 1:N automatic protection switching (APS). APS can be used when there are at least N+1 links between two points in a network. N of these links are active while one is a spare that is automatically put in service when one of the active links fails. APS is a local action that involves no changes elsewhere in the network.

Line switching is another protection mechanism which is similar to APS except that the protection "line" is actually a multi-hop "virtual line" through the network. In the case of line switching, all of the traffic using the failed line is switched over the protection "virtual line", which can potentially cause traffic loops in the network. An example of line protection switching occurs in the case of a SONET (synchronous optical network) bidirectional line switched ring (BLSR).

A third protection mechanism is path switching. In path switching, the protection that is provided in the network is path specific and generally traffic loops can be avoided. Path switching is generally the most bandwidth efficient protection mechanism; however, it suffers from the so-called "failure multiplication" problem wherein a single link failure causes many path failures. There are two approaches to path protection: passive and active.

In the passive approach, data is transmitted in parallel on both a working path and a protection path. The destination node selects between the two paths, without requiring any action from upstream nodes. Passive path switching is prevalent in the case of a SONET unidirectional path switched ring (UPSR) in which all of the traffic goes to (or comes from) a hub node. One drawback with the passive approach is that it wastes line and switch capacities.

In the active approach, a message is sent toward the source (starting from the point of failure) to signal the failure and to request a switchover to a protection path at some recovery point. There are two basic ways of signaling the failure: explicit and implicit.

In the explicit method, the node discovering the failure sends a message upstream on all paths that use the failed element. This message should eventually reach a recovery point. Unfortunately, the process of scanning lists and sending numerous distinct messages (possibly thousands in a large network) can be time consuming. In the implicit method, the node discovering the failure broadcasts a notification message to every node in the network. That message contains the identity of the failed element. Upon receiving such a message, a node scans all the protection paths passing through it and takes appropriate actions for paths affected by the failure.

Except in very large networks where the number of links vastly exceeds the number of paths per link, the implicit method is generally faster because it requires fewer sequential message transmissions and because the propagation of messages takes place in parallel with recovery actions. However, having a node find out which of its paths uses a failed network element can be a lengthy process, potentially more demanding than finding all paths using a failed network element.

SUMMARY

A need exists for a capability for accelerating implicit failure notification in a network. There is a further need for a failure notification mechanism that provides for reliable broadcast of failure messages.

The approach of the present system and method provides for fast and reliable failure notification and accelerated switchover for path protection. Accordingly, the present system for path protection includes a method of failure notification in a communications network in which there can be several overlapping areas of nodes interconnected by communications links. In the system and method for path protection described herein, a "failure event" contemplates and includes failed communications links and failed nodes. In particular, if a node fails, adjacent nodes can detect the node failure as one or more failed links. Upon a failure event involving one of the communications links, a failure message is broadcast identifying the failed link, the broadcast being confined within the areas which include the failed link. The broadcasting includes detecting the link failure at one or both of the nodes connected to the failed link, identifying nodes connected to the one or both detecting nodes that belong to the same area as the failed link and sending the failure message only to such identified nodes. At each node that receives the broadcast failure message, nodes connected thereto which belong to the same areas as the failed link are identified and the failure message is sent only to such identified nodes.

According to another aspect of the system, a reliable transmission protocol is provided wherein at one or more of the nodes, a LAPD (link access protocol—D channel) protocol unnumbered information frame containing the failure message is sent to connected nodes. The failure message is resent in another unnumbered information frame after a time interval unless an unnumbered acknowledgment frame containing or referencing the failure message is received from the connected node.

According to yet another aspect of the system, each node includes plural line cards each of which terminate a link to another node. Link failures are detected at one of the line cards connected to the failed link and a failure message is sent to the other line cards on a message bus within the node of the detecting line card. At each of the other line cards, the failure message is sent to the associated connected node.

According to still another aspect of the present system, a method of path protection in a network of nodes interconnected by communications links includes establishing a plurality of working paths through the nodes, each working path comprising logical channels of a series of links. For each working path, an associated protection path comprising logical channels of a different series of links is precalculated and a priority is assigned to each working path and associated protection path. The assigned priority can differ between the working path and its associated protection path. In a network having overlapping areas of nodes interconnected by links, a protection path is precalculated for each area through which a particular working path traverses. Each protection path is assigned a bandwidth that can range from 0 to 100 percent of the bandwidth associated with the corresponding working path. Upon a failure event involving at least one of the links, the working paths that include the at least one failed link are switched to their respective protection paths, with a higher priority protection path preempting one or more lower priority paths that share at least one link if the link capacity of the at least one shared link is otherwise exceeded by addition of the preempting protection path. The higher priority protection paths can preempt lower priority protection paths and lower priority working paths that share at least one link.

In accordance with another aspect, a method of protection path switching includes establishing a plurality of working paths, each working path including a working path connection between ports of a switch fabric in each node of a series of interconnected nodes. At each node, a protection path activation list is maintained for each communications link in the network, each list comprising an ordered listing of path entries, each path entry associated with a particular working path for that communications link and including at least one path activation command for effecting activation of a protection path connection between ports of the switch fabric. Upon a failure event involving one of the communications links, the method includes sequentially implementing the path activation commands for each of the path entries of the particular protection path activation list associated with the failed link.

In a further aspect, a working path deactivation list is maintained for each communications link in the network, each list comprising an ordered listing of path entries, each path entry associated with a particular working path for that communications link and including at least one path deactivation command for effecting deactivation of one of the working path connections between ports of the switch fabric. Upon a failure event involving one of the communications links, the method includes sequentially implementing the path deactivation commands for each of the path entries of the particular working path deactivation list associated with the failed link prior to implementing the path activation commands of the corresponding protection path activation list.

In yet another aspect, a drop list is maintained for each switch fabric output port, each drop list comprising an ordered listing of path entries, each path entry including at least one path deactivation command for effecting deactivation of a path connection using that switch fabric output port if the protection path data rate is greater than the available port capacity.

BRIEF DESCRIPTION OF THE DRAWINGS

The foregoing and other objects, features and advantages will be apparent from the following more particular description of preferred embodiments of the method and system for path protection in a communications network, as illustrated in the accompanying drawings in which like reference characters refer to the same parts throughout the different views. The drawings are not necessarily to scale, emphasis instead being placed upon illustrating the principles of the invention.

FIG. 16 is a schematic diagram illustrating an embodiment of a table and linked list for dropping paths.

FIG. 17 is a table indicating the structure for keeping port capacities and drop pointers associated with the table and drop list of FIG. 16.

DETAILED DESCRIPTION

Figure 1:
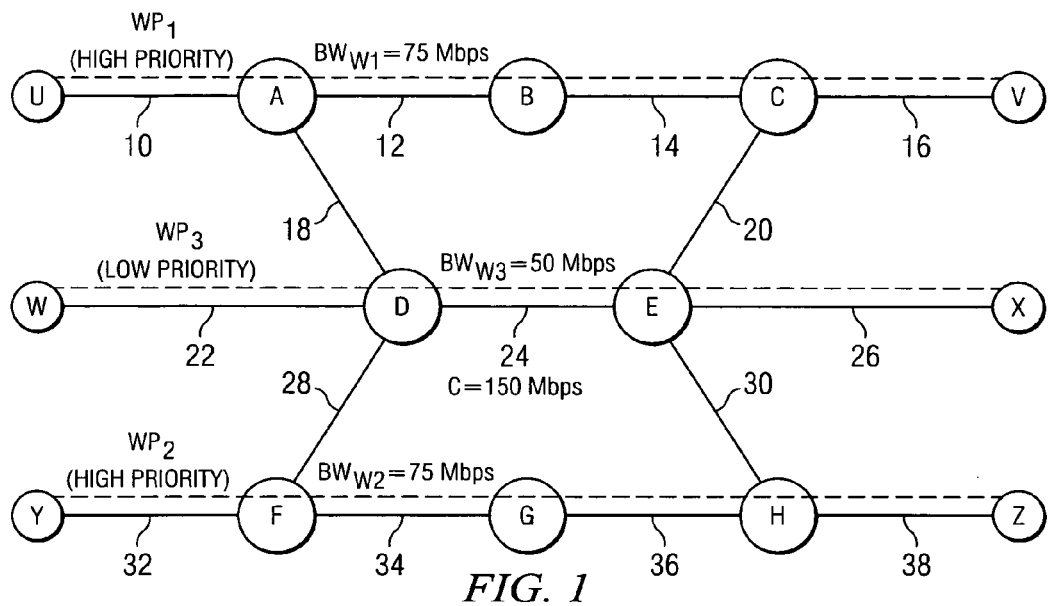
FIG. 1 shows a communications network of switching nodes with several working paths configured through the network.

FIG. 1 illustrates in schematic form a communications network which includes several switching nodes denoted A, B, C, D, E, F, G and H. The nodes are interconnected by physical communications links 12, 14, 18, 20, 24, 28, 30, 34 and 36. The network further includes endpoints U, V, W, X, Y and Z which are connected to corresponding nodes A, C, D, E, F and H by links 10, 16, 22, 26, 32 and 38, respectively. An embodiment of the switching node is described further herein.

The network is used to configure logical connections or working paths between endpoints. Each working path begins at one endpoint, traverses one or more nodes and communications links and terminates at a second endpoint. Three such working paths $WP_1$, $WP_2$ and $WP_3$ are shown in FIG. 1. These three paths are shown as examples, and it should be evident that other working paths can be configured through different combinations of nodes. The first working path $WP_1$ begins at endpoint U, traverses nodes A, B, C and links 10, 12, 14, 16 and terminates at endpoint V. The second working path $WP_2$ starts at endpoint W and passes through nodes D, E and links 22, 24, 26 and terminates at endpoint X. The third working path $WP_3$ begins at endpoint Y and traverses nodes F, G, H and links 32, 34, 36, 38 and terminates at endpoint Z.

The communications links each have a fixed capacity or bandwidth for carrying logical channels. Each working path uses a logical channel on each of the links along the particular path. In general, the number of working paths passing through any particular link should not exceed the link capacity. As indicated in FIG. 1, working paths $WP_1$ and $WP_2$ each require a bandwidth of 75 Mbps while working path $WP_3$ requires a bandwidth of 50 Mbps. The bandwidth capacity of communications link 24 is shown as 150 Mbps. Thus, link 24 can accommodate additional working paths having bandwidth requirements up to 100 Mbps. These particular bandwidths are given only by way of example and are not meant to limit the invention.

It should be noted that for simplicity and ease of explanation, only a single communications link is shown between nodes. In certain embodiments, multiple links can be used between nodes, each such link carrying one of many possible optical wavelengths or "colors". In such a case, the multiple links are carried in one or more optical fiber cables. Thus, a fiber cable cut or failure can result in several simultaneous optical link failures. It should also be noted that principles of the approach described herein can be applied in embodiments in which the communications links include wired and wireless links.

In accordance with an aspect of the present system, each of the working paths and protection paths is assigned a priority level. A protection path and its associated working path are not necessarily assigned the same priority. Those working paths and protection paths having low priority are deemed preemptable by higher priority protection paths. A path that cannot be preempted is also referred to as being non-preemptable. As described further herein, a high priority protection path can preempt one or more low priority paths that share a communications link if the link capacity of the shared link would otherwise be exceeded by addition of the preempting protection path. In the exemplary network of FIG. 1, working paths $WP_1$ and $WP_2$ are assigned high priority and the working path $WP_3$ is assigned low priority. It should be understood that there can also be a range of priority levels such that one protection path can have a higher priority than another protection path.

Figure 2:
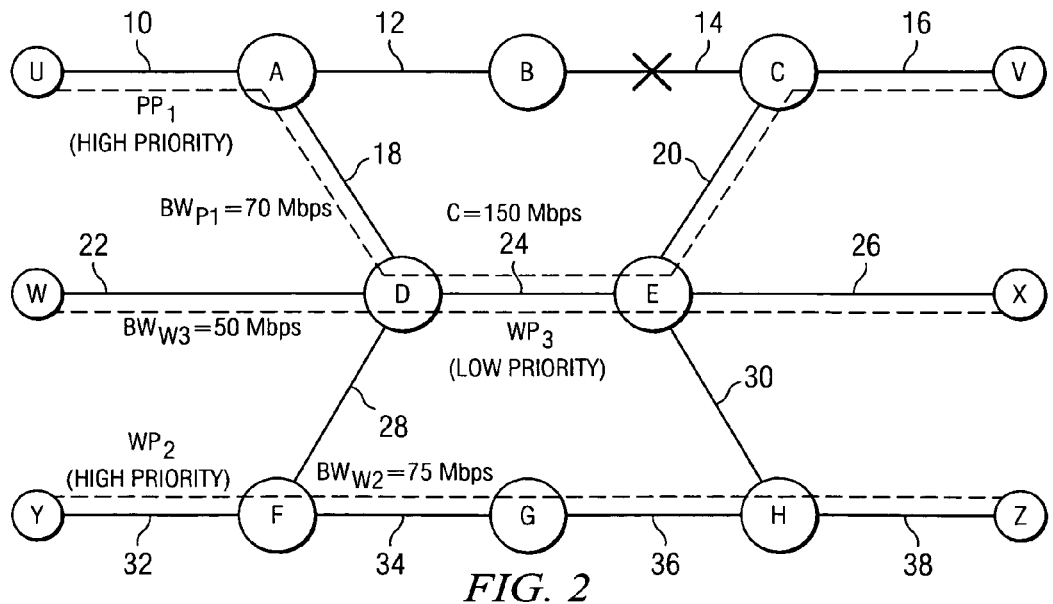
FIGS. 2 and 3 show the network of FIG. 1 reconfigured with protection paths to handle particular link failures in the working paths.

FIG. 2 illustrates the network of FIG. 1 reconfigured to handle a failure in the first working path $WP_1$. In this example, a failure has occurred on communications link 14 and the logical connection that traversed the path defined by working path $WP_1$ is now provided using a protection path $PP_1$. In accordance with another aspect of the system, a mechanism for effecting fast switchover to the protection path is described further herein.

As described further herein, the protection path $PP_1$ is precalculated at the time the working path $WP_1$ is configured in the network. The bandwidth for the protection path can be provisioned in a range from 0 to 100% of the working path bandwidth. In this case, the bandwidth of protection path $PP_1$ is provisioned as 70 Mbps. The protection path $PP_1$ starts at endpoint U, traverses nodes A, D, E, C and links 10, 18, 24, 20, 16 and terminates at endpoint V. As shown in FIG. 2, the protection path $PP_1$ shares the communications link 24 between nodes D and E that is used to carry working path $WP_3$. Since the total bandwidth (120 Mbps) required to handle protection path $PP_1$ and working path $WP_3$ is less than the capacity of link 24, no preemption is needed.

Figure 3:
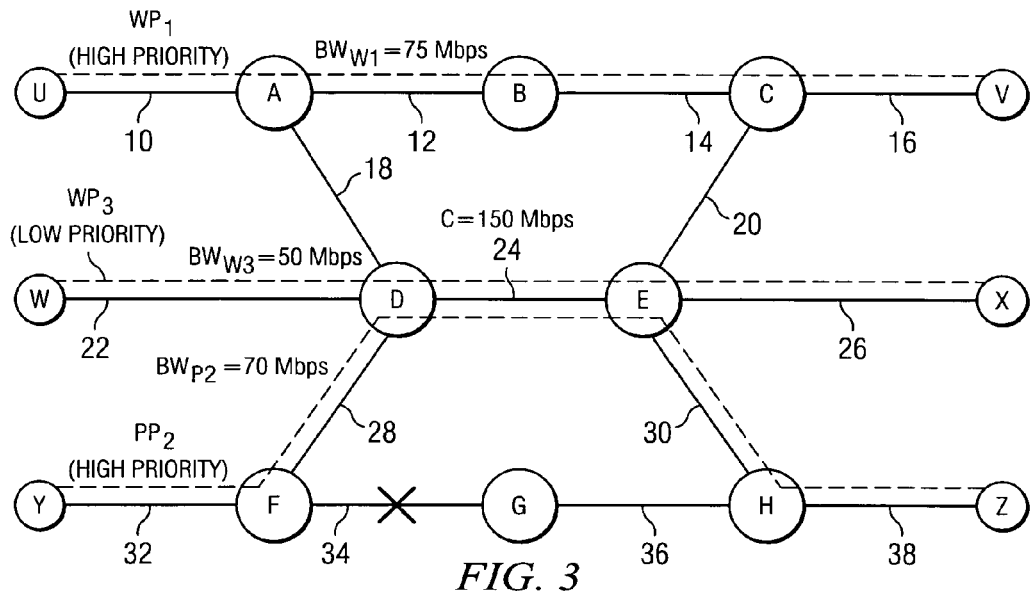

FIG. 3 illustrates the network of FIG. 1 reconfigured to handle a failure in the second working path $WP_2$. In this example, a failure has occurred on communications link 34 and the logical connection that traversed the path defined by working path $WP_2$ is now provided using a protection path $PP_2$. The protection path $PP_2$ is precalculated at the time the working path $WP_2$ is configured in the network and the provisioned bandwidth is 70 Mbps. The protection path $PP_2$ starts at endpoint Y, traverses nodes F, D, E, H and links 32, 28, 24, 30, 38 and terminates at endpoint Z. As shown in FIG. 3, the protection path $PP_2$ shares the communications link 24 between nodes D and E that is used to carry working path $WP_3$. Again, since the total bandwidth (120 Mbps) required to handle protection path $PP_2$ and working path $WP_3$ is less than the capacity of link 24, no preemption is needed.

Figure 4:
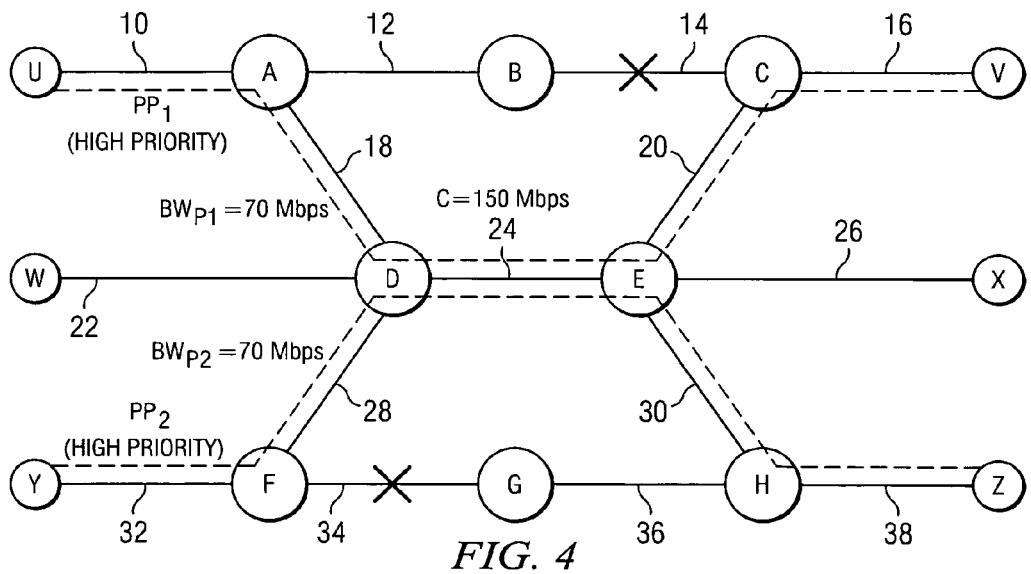
FIG. 4 shows the network of FIG. 1 reconfigured with protection paths to handle link failures with preemption.

FIG. 4 illustrates the network of FIG. 1 which has been reconfigured to handle multiple failures in the links. In particular, a failure on links 14 and 34 has occurred. As was shown in FIGS. 2 and 3, these failures are handled by switching the working paths $WP_1$, $WP_2$ to protection paths $PP_1$, $PP_2$. However, since the capacity of link 24 would be otherwise exceeded by the addition of the high priority protection paths $PP_1$ and $PP_2$ working path $WP_3$ is preempted, that is, the path is dropped and the associated bandwidth is made available to protection paths $PP_1$ and $PP_2$. It should be understood that, if protection path $PP_1$ instead has a higher priority than protection path $PP_2$, then protection path $PP_1$ can also preempt protection path $PP_2$ should the need arise due to differing capacity constraints on the shared link 24.

To configure paths, a centralized network management system (not shown) attempts to find routes with enough capacity for all working and protection paths. The network management system also finds routes for the preemptable paths, reusing the protection capacity of non-preemptable paths.

Figure 5:
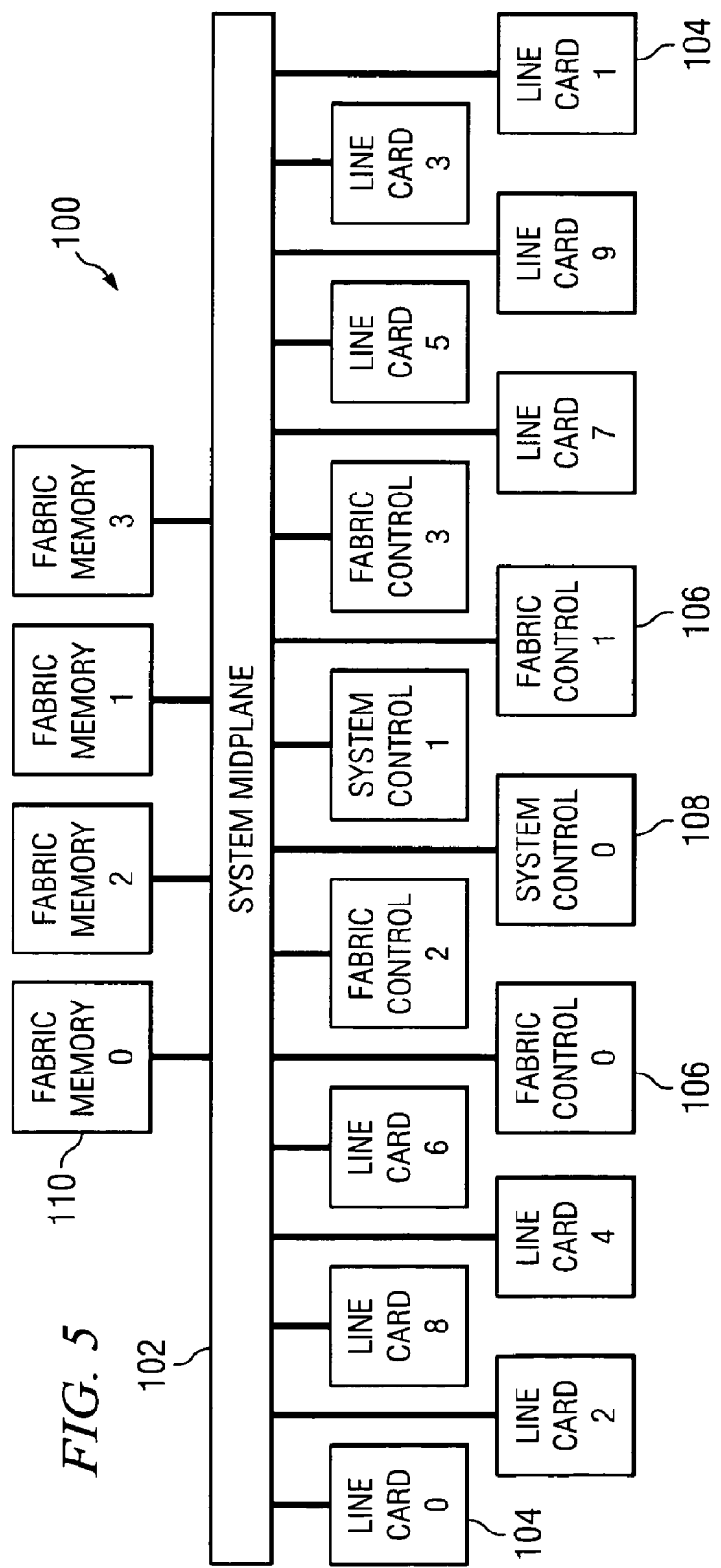
FIG. 5 is a block diagram showing a preferred embodiment of a switching node.
Figures 1, 6A:
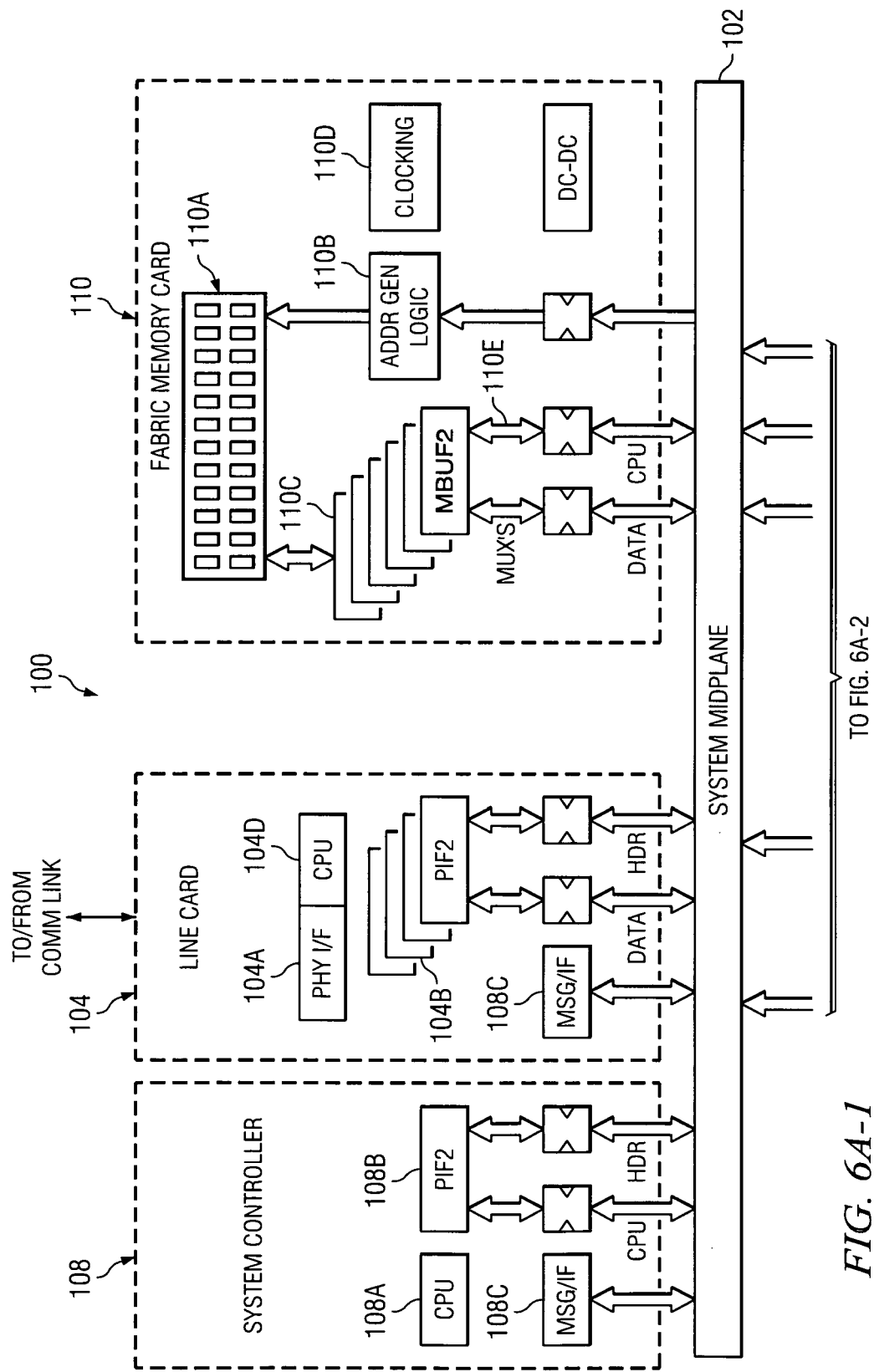
FIG. 6A (comprising 6A-1 and 6A-2) is a schematic block diagram showing the switching node of FIG. 5.
Figures 2, 6A:
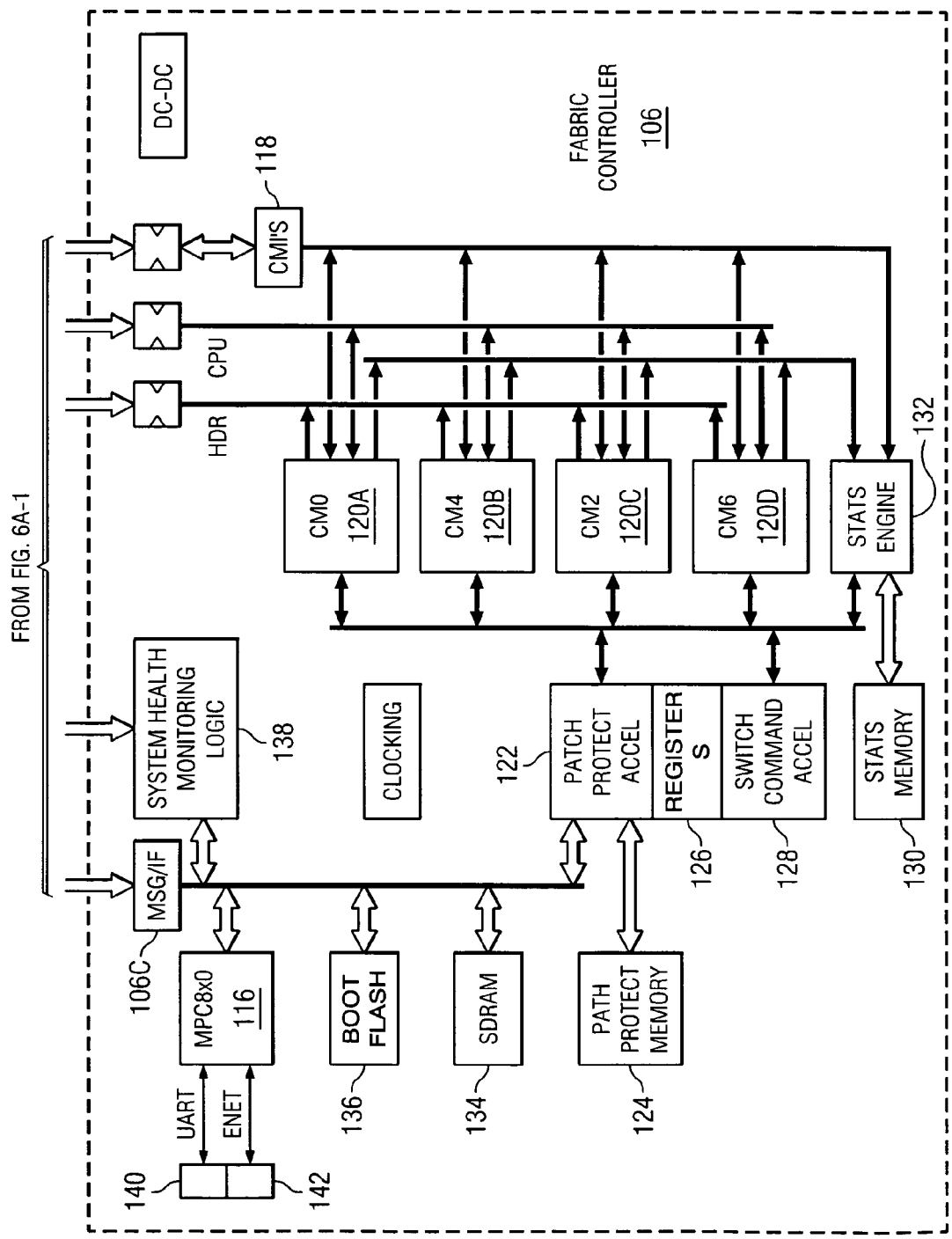
Figure 6B:
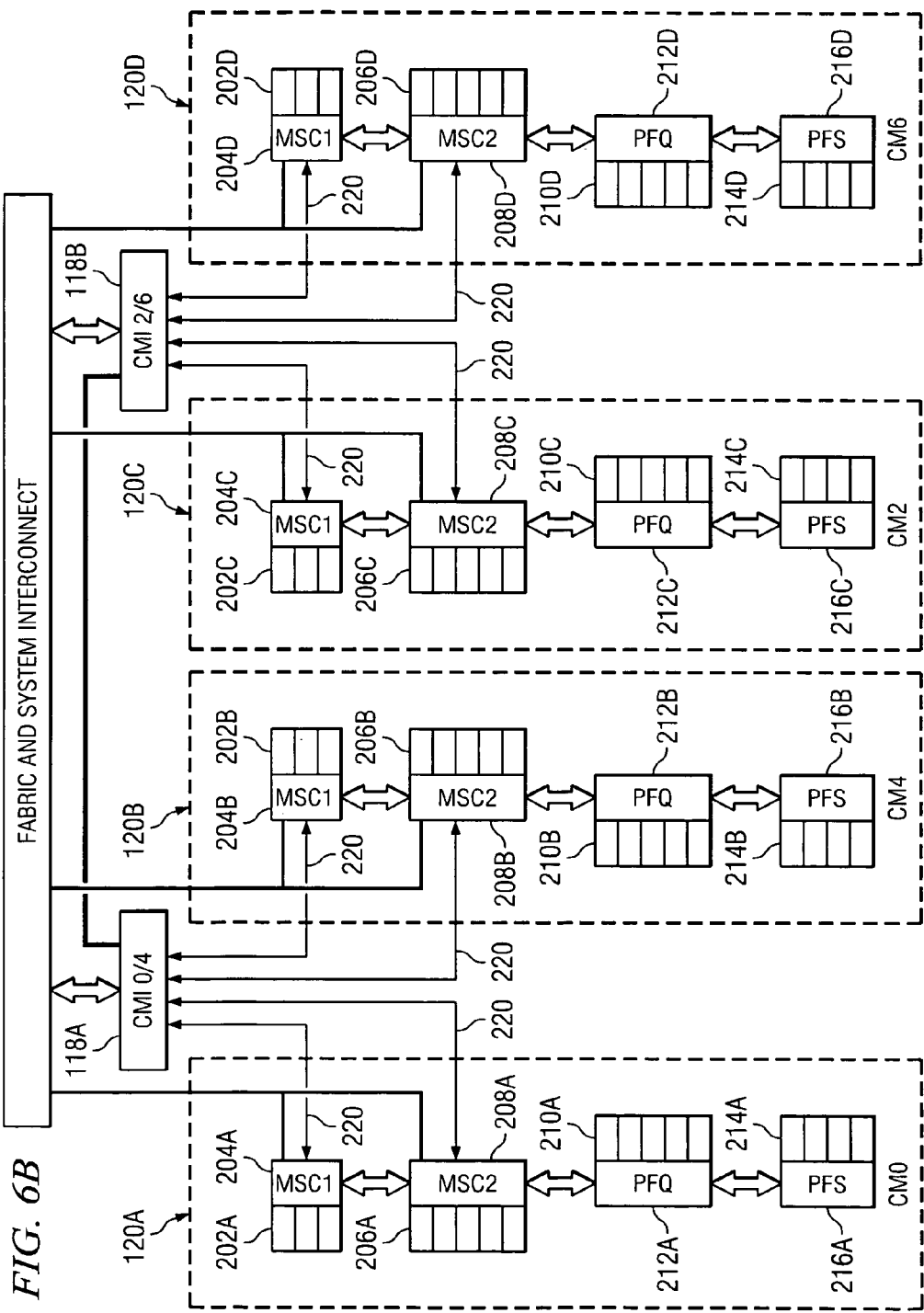
FIG. 6B is a schematic block diagram of the control module portion of the fabric controller card in FIG. 6A.

An embodiment of a switching node 100 is now described at a high level with reference to FIGS. 5, 6A and 6B.

In FIG. 5 a block diagram of a system arrangement for switching node 100 is shown. The switching node 100 provides cell and packet switching and includes a system midplane 102 to which are connected different types of system cards. The system cards include line cards 104, fabric controller cards 106, system controller cards 108 and fabric memory cards 110.

FIG. 6A shows a schematic block diagram of the switching node 100. For simplicity of discussion, only one line card 104 is shown. Each line card 104 includes a physical interface 104A for an I/O port that connects to an external communications link. The line card 104 further includes port interface circuits 104B for buffering cells, a message bus interface 104C which is used to communicate over a message bus that is carried on the midplane 102 and a processor 104D. The system controller 108 also includes a message bus interface 108C, port interface circuits 108B and a processor 108A.

The terms "fabric" and "switch fabric" are used interchangeably herein to refer to the combined control and cell/packet buffer storage components of the system. The fabric memory card 110 provides the cell buffer storage and includes static RAM 110A, address generation logic 110B, memory buffers 110C and clocking 110D. The memory buffers 10C buffer cells between memory 110A and the port interface circuits 104B, 108B on the line cards 104 and system controller 108, respectively. The address generation logic 110B derives the physical addresses for cell storage by snooping control messages transported on the midplane 102. The memory card 110 further includes multiplexers 110E which multiplex the cell data paths between the midplane 102 and the memory buffers 110A.

In an embodiment, the port interface circuits 104B, 108B each use a PIF2 chip, the memory buffers 10C each use a MBUF2 chip, and the multiplexers 110E use ViX™ interconnect logic, all of which are provided by MMC Networks.

The fabric controller card 106 performs many of the functions that relate to aspects of the present invention. The fabric controller includes four control modules 120A, 102B, 120C, 120D and a control module interface 118 for interfacing the control modules to the midplane 102. Each control module manages cell flows for a subset of the I/O ports.

System-wide messaging paths exist between the fabric controller card 106, system controller 108, and the line cards 104. Normal cell data paths are between the line cards and the fabric memory card 110. CPU cell data paths are between the fabric controller card and the fabric memory or between the system controller and the fabric memory. Finally, cell header paths are between the line cards and the fabric controller card, or between the system controller and the fabric controller card.

In an embodiment, the fabric controller card 106 uses the controller portion of the AnyFlow 5500™ chip set provided by MMC Networks. These five chips completely determine the behavior of the fabric. Each control module (CM) 120A–120D includes 4 of the 5 chips, and manages 16 I/O ports of the switching node 100. Each CM pair is cross-coupled using the 5th chip of the set, the CMI 118, which provides a hierarchical communication path between CMs. A single fabric controller card 106 has four complete CMs, allowing it to control up to 64 ports of the fabric. When two FCCs 106 are installed, 128 fabric ports are supported.

Referring now to FIG. 6B, a block diagram is shown of a layout and interconnect scheme for the MMC chip set. Each of the control modules 120A–120D includes two different modular switch controllers (MSC1) 204A–204D and (MSC2) 208A–208D, respectively, a per-flow queue controller (PFQ) 212A–212D and a per-flow scheduler (PFS) 216A–216D. The CMI 118A, 118B are shared between CM pairs 120A, 120B and 120C, 120D, respectively. The chip set runs synchronously at 50 MHZ.

Each MSC1, MSC2 pair communicates with other MSC pairs in the system via the CMIs 118A, 118B using dedicated internal buses 220. The messages passed between MSCs contain the information needed for each CM to maintain its own set of captive data structures, which together comprise the complete state of the cell switching fabric. Each MSC1 204A–204D has a CPU port (not shown) for internal register access. Both the MSC1 and the MSC2 have interfaces to the cell header portion of the fabric interconnect matrix 110 (FIG. 6A), but only the MSC2 drives this bus. Both devices have unique captive memories 202A–202D and 206A–206D, respectively, for their own data structures.

The PFQ 212A–212D manages the cell queues for each output flow associated with its 16 output ports. It connects to the MSC2 and its own local memories 210A–210D. The PFS 216A–216D supports an assortment of scheduling algorithms used to manage Quality of Service (QoS) requirements. The PFS has its own local memories 214A–214D and its own CPU register interface. The PFQ and PFS communicate via flow activation and deactivation messages.

The CMIs 118A, 118B route messages between MSCs in CM pairs. The CMIs are meshed together in a specific fashion depending on the number of CM pairs, and therefore the total number of supported ports and fabric bandwidth.

Referring again to FIG. 6A, the fabric controller card 106 further includes a control processor 116. The control processor 116 which is, for example, a Motorola MPC8x0, provides for setup of the MMC data structures and the internal registers of the CM chip set. The control processor 116 has a path to the system-wide message bus provided on the midplane 102 through message interface 106C for communication with the main processor 108A on the system controller card 108.

The fabric controller card 106 further includes local Flash PROM 136 for boot and diagnostic code and local SDRAM memory 134 into which its real-time image can be loaded and from which it executes. The card supports a local UART connection 140 and an Ethernet port 142 which are used for lab debugging.

In addition, the card includes system health monitoring logic 138, stats engine 132, stats memory 130, path protection accelerator 122, path protection memory 124, registers 126 and switch command accelerator 128.

The path protection accelerator 122, which in an embodiment is implemented as an FPGA, is used to speed-up the process of remapping traffic flows in the fabric and is described in further detail herein below. The switch command accelerator 128 facilitates the sending and receiving of certain types of cells (e.g., Operations, Administration and Management cells) between the fabric control processor 116 and the MSC1 204A–204D (FIG. 6B). The stats engine 132 and stats memory 130 are used for accumulating statistics regarding the cell traffic through the switching node 100.

Figure 6C:
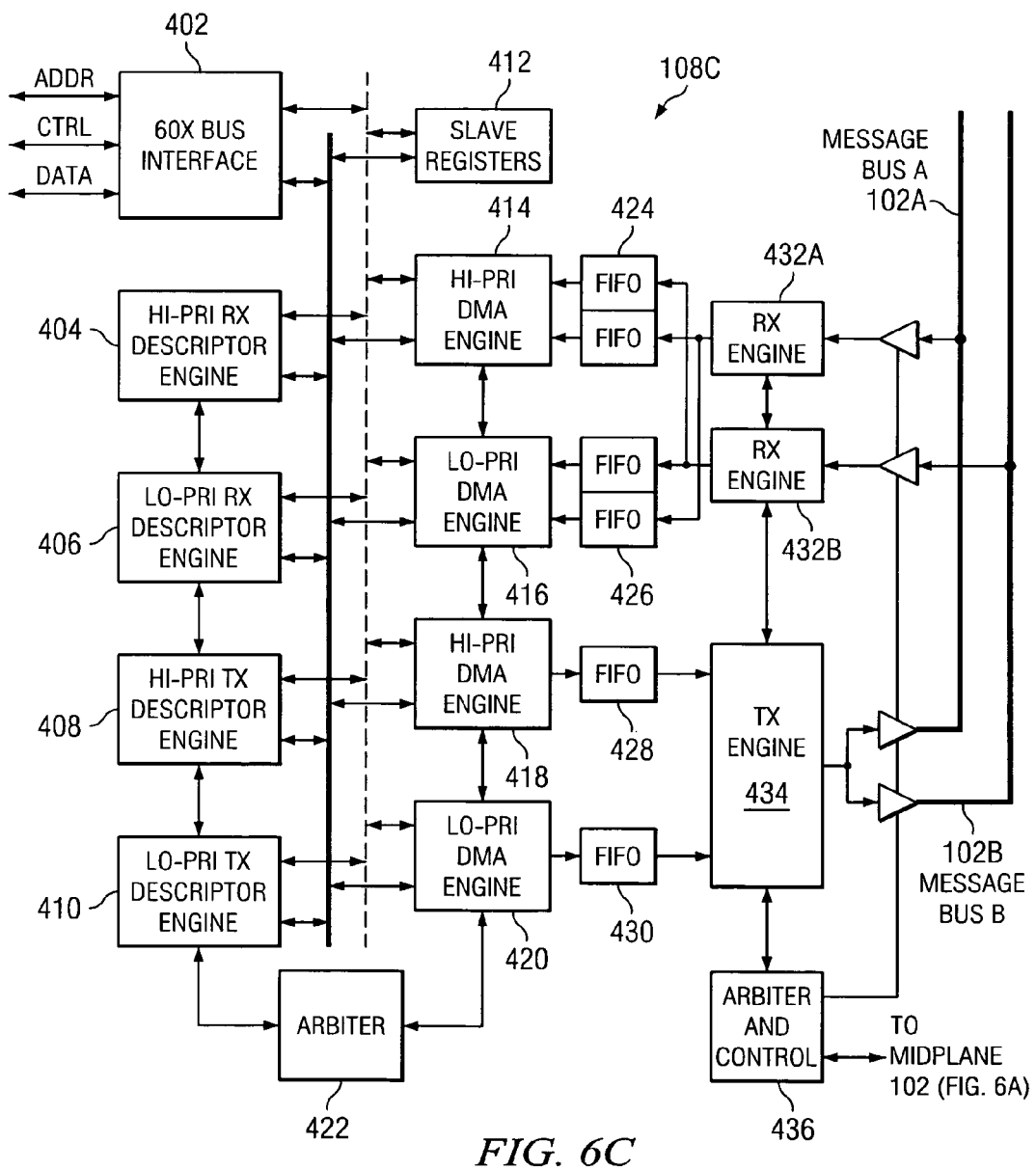
FIG. 6C is a schematic block diagram of the message bus interface logic.

As noted herein above, the processors 108A, 104D, and 116 (FIG. 6A) in the system controller card 108, the line card 104 and the fabric controller card 106, respectively, communicate via a redundant message bus carried on the midplane 102 through corresponding message bus interfaces 108C, 104C, 106C. The message bus interface 108C, which can be implemented in an FPGA, is shown connected to message bus 102A, 102B in FIG. 6C and includes the following features:

Packet based data transfers on two independent rails (102A, 102B);
Peak transmit rate of 400 Mbit/sec (16 bits*25 Mhz) using one rail;
Peak receive rate of 800 Mbit/sec (both rails active);
CRC based error detection;
Flow control on both rails.

The message bus interface 108C includes a 60x Bus Interface 402; descriptor engines 404, 406, 408 and 410; DMA engines 414, 416, 418 and 420; FIFOs 424, 426, 428 and 430; receive (RX) engines 432A, 432B and transmit (TX) engine 434. In addition, the message bus interface 108C includes slave registers 412, arbiter 422 and arbiter/control 436. Note that the message bus interfaces 104C and 106C are configured similarly.

The 60x bus interface logic 402 interfaces an external 60x bus to the internal FPGA logic of the message bus interface 108C. Primary features of the 60x bus interface logic include support of single and burst transfers as a master and support of single beat slave operations. The latter are required to access internal registers for initialization and to read interrupt status.

The message bus interface 108C supports four external memory-resident circular queues (not shown). The queues contain descriptors used for TX and RX operations. The descriptor engines, which include high-priority RX and TX descriptor engines 404, 408 and low-priority RX and TX descriptor engines 406, 410, respectively, fetch from these external memory queues and initiate DMA operations whenever they have a valid descriptor and there is data to be transferred.

The DMA engines, which include high-priority RX and TX DMA engines 414, 418 and low-priority RX and TX DMA engines 416, 420, respectively, transfer data between FIFOs 424, 426, 428 and 430 and the external 60x bus. When a valid descriptor is present, the address and byte count are loaded in the corresponding DMA engine. The byte count is sourced from the descriptor during TX and sourced from a frame header during RX. The high and low priority TX DMA engines 418, 420 read data from external memory and the high and low priority RX DMA engines 414, 416 write data to external memory.

The RX DMA engines 414, 416 include a special feature to prevent stuck flow controls if the data bus is not available to the corresponding DMA engine or if the corresponding descriptor engine is idle. Normally the associated FIFO will fill to its watermark and then assert flow control. DMA transfers to memory or FIFO flushing can clear the almost full indication and thus turn off flow control. Whenever the descriptor engine is idle and new message bus data is arriving, the DMA engine will drain the FIFO until an EOF (end of frame) or SOF (start of frame) condition occurs. The latter indicates a dropped EOF. This continues until the descriptor engine goes non-idle. The transition to non-idle is only checked inter-frame, therefore partial frames are never transferred into memory.

The TX DMA engines 418, 420 support descriptor chaining. At the end of a normal (not chained) transfer, the DMA engine places a CRC word and an EOF marker in the FIFO. This marker informs the TX engine that the message is over. If the descriptor's chain bit is set, upon completion of the DMA transfer, no CRC word or EOF marker is placed in the FIFO. Once a descriptor without the chain bit set is encountered, completion of the DMA transfer results in the writing of a CRC word and EOF marker.

The arbiter 422 determines which master is allowed to use the 60x bus next. Highest priority is given to descriptor accesses since requiring a descriptor implies no data transfer can take place and descriptor accesses should be more rare than data accesses. Receive has priority over transmit and of course, higher priority queues are serviced before low priority queues. CPU accesses ultimately have the highest priority since ownership of the 60x bus is implied if the CPU is trying to access this logic.

Overall priority highest to lowest is:
CPU slave Accesses
Hi-priority RX descriptor fetch
Hi-priority TX descriptor fetch
Low-priority RX descriptor fetch
Low-priority TX descriptor fetch
Hi-priority RX DMA
Hi-priority TX DMA
Low-priority RX DMA
Low-priority TX DMA The TX engine 434 monitors the status of FIFOs 428, 430 and initiates a request to the message bus logic when a SOF is present in the FIFO. Once granted access to one of the message buses 102A, 102B, the TX engine streams the FIFO data out in 16 bit quantities until an EOF condition occurs. Two events can inhibit transmission (indicated by lack of a valid bit on the message bus), namely an empty FIFO or flow control from a receiver.

The RX engines 432A, 432B monitor the message bus and begin assembling data into 64 bit quantities prior to storing them in the corresponding FIFOs 424, 426. The RX engine simply loads the FIFO until an almost full watermark occurs. At that point, the RX engine asserts flow control and prevents the transmitter from sending new data until the FIFO drains.

The arbiter/control logic 436 arbitrates for the message buses 102A, 102B and controls external transceiver logic. Normally this logic requests on both message buses 102A, 102B and uses whichever one is granted. Slave register bits (and also the descriptor header) can force usage of a single message bus to prevent requests to a broken bus. Also present in the logic 436 is a timer that measures bus request length. If timer reaches a terminal count, the request gets dropped and an error is reported back to the associated processor.

Each message bus 102A, 102B requires a centralized arbitration resource. In an embodiment having 16 primary card slots, the system requires 32 request lines (for high and low priority) and 16 grant lines per message bus. Arbitration is done in a round-robin fashion in a centralized arbitration resource located on the system controller card 108, with high-priority requests given precedence over low priority requests.

Each message bus includes the following signals:

| | |
|---|---|
| FR | Frame 604 |
| VALID | Valid bit 612 |
| SOF | Start-of-frame 614 |
| EOF | End of frame 616 |
| DATA[15:0] | Data bus signal 618 |
| FC | Flow Control 620 |

Figure 6D:
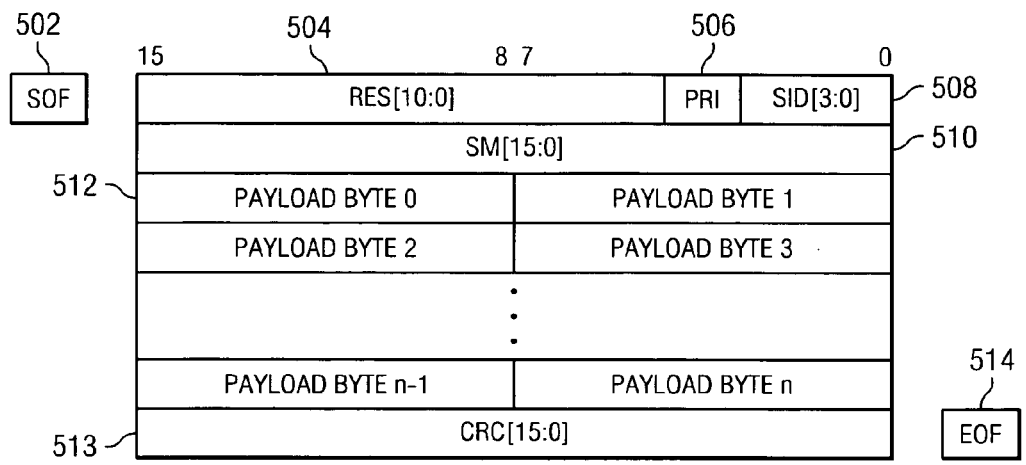
FIG. 6D illustrates a message bus frame format.

Messages sent over the message bus 102A, 102B have the frame format shown in FIG. 6D. The message frame includes start of frame (SOF) 502, a reserved field 504, a priority bit 506, a source ID (SID) 508, a count/slot mask (SM) 510, payload bytes 512, CRC 513 and an end of frame (EOF) 514. The SOF 502 is always asserted with the first byte of a frame. The priority bit 506 and SID 508 are valid during SOF. The next four bytes are the remainder of the header: count and slot mask 510. The next byte(s) are the variable size payload 512, with a minimum size of one byte. The final two bytes are the CRC 513, followed by EOF 514. The CRC covers all header and payload bytes. The length of messages on the message bus 102A, 102B is bounded such that a deterministic latency is achieved to ensure priority accesses of the bus.

Figure 6E:
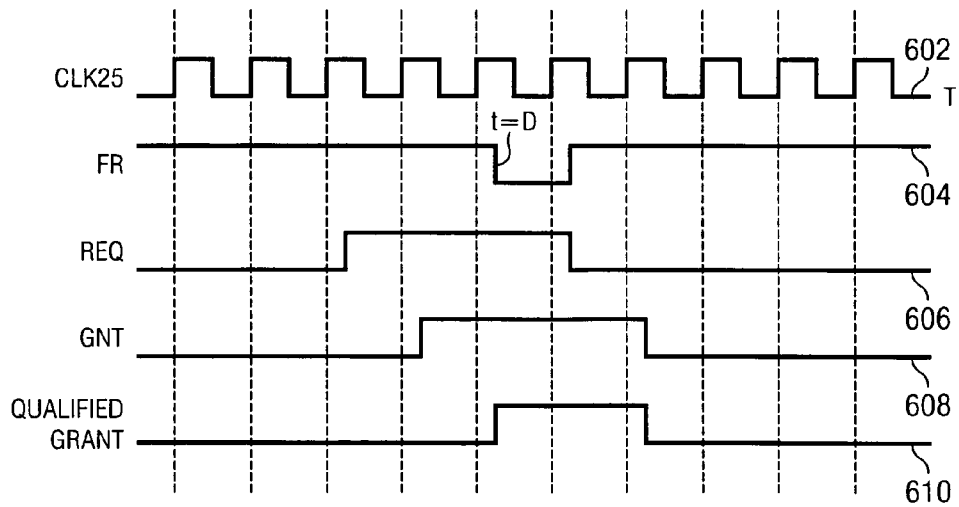
FIG. 6E is a timing diagram relating to message bus arbitration.

Message bus arbitration signaling for the message bus 102A, 102B, as seen by a bus requestor using message bus interface 108C, is shown in FIG. 6E wherein the following signals are used: CLK—25 Mhz clock signal 602; FR—message bus frame signal 604; REQ—message bus request signal 606; GNT—message bus grant signal 608 and qualified grant signal 610. Note that the FR signal 604 indicates the message time inclusive of SOF and EOF. The requester must ignore the GNT signal 608 until FR de-asserts, e.g., at time t=D. Once the grant is qualified by FR de-assertion at time t=D, with corresponding qualified grant signal 610 assertion, the new master may drive FR and other signals one cycle later. This allows one dead cycle between frames.

Figure 6F:
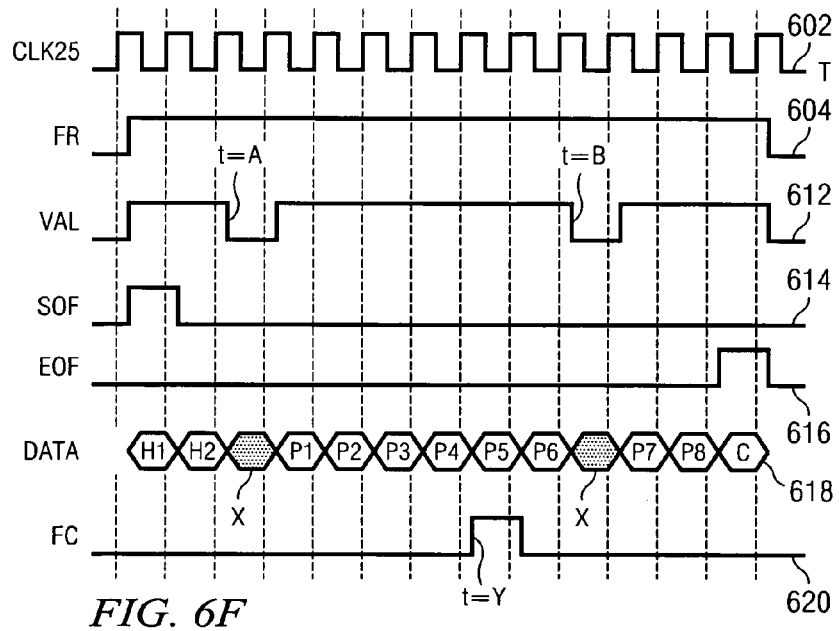
FIG. 6F is a timing diagram relating to message transfer.

Message bus transfer signaling for the message bus 102A, 102B is shown in FIG. 6F wherein a typical (but very short) message bus transfer is illustrated. The DATA bus signal 618 is shown with H1, H2 indicating header bytes, P1, P2, P3, P4, P5, P6, P7, P8 indicates payload bytes, C indicating CRC byte, and X indicating invalid data. Note that the valid signal 612 can be de-asserted autonomously, e.g., at time t=A in any non SOF/EOF cycle. This indicates, for example, that the TX FIFO (428, 430, FIG. 6C) went empty during the transfer and is awaiting new data. Some internal FPGA pipelining is allowed to occur such that the FC signal 620 does not need to be responded to immediately. The second de-assertion of the valid signal 612 at time t=B is the result of the assertion of the FC signal 620 at time t=Y two cycles earlier.

Broadcast Algorithm

The present invention includes a scheme for implicit failure notification which features fast and reliable distributed broadcast of failure messages both between and within nodes.

Another important aspect of the broadcast notification according to the present invention is the notion of confining broadcast messages within a network area. The task of computing paths, either in a centralized or in a decentralized manner, becomes complex in large networks. In order to effectively manage large networks, it is helpful to divide them into smaller areas. The need to limit area size stems from considerations relating to network manageability, protection algorithm scaleability, and the need to reduce switching delays. A related issue is that of reducing the number of notification messages by limiting them to a local area. In order to do that, the segment of a working path in a particular area is protected by a protection path in the same area. Thus, adjacent areas may overlap somewhat. Another requirement is that each area must provide enough internal connectivity to provide the necessary protection elements. It is generally preferably to divide the network nodes into doubly-connected areas that overlap as little as possible, with just enough overlap to guarantee double connectivity. These concepts find application in SONET, wherein areas can be mapped to UPSR and BLSR rings.

Figure 7:
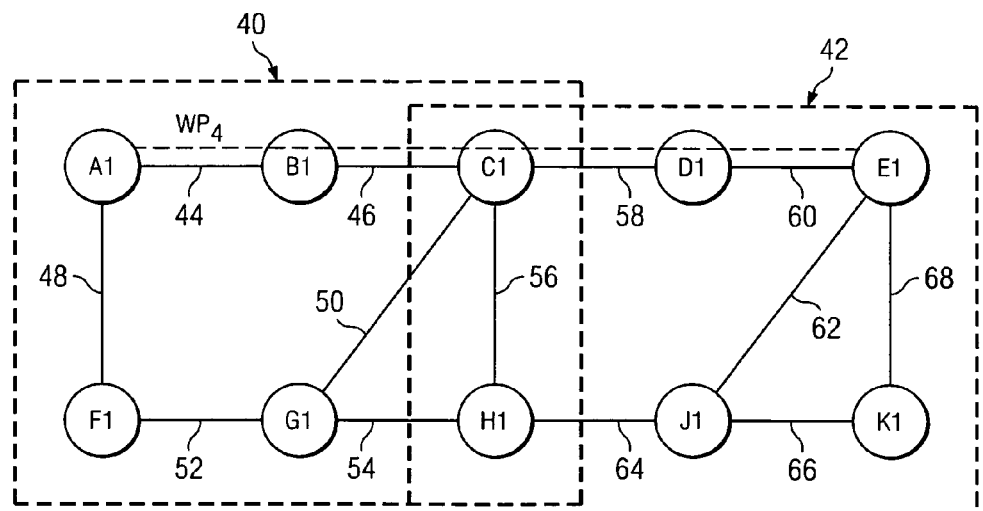
FIG. 7 shows a network of nodes arranged in overlapping areas.

Referring now to FIG. 7, a network arrangement is shown which includes two overlapping node areas 40 and 42. In particular, node area 40 includes nodes A1, B1, C1, F1, G1 and H1. Node area 42 includes nodes C1, D1, E1, H1, J1 and K1. Note that the overlap occurs such that nodes C1 and H1 and link 56 are fully included in both areas. A working path $WP_4$ is also shown which starts at node A1, traverses nodes B1, C1, D1 and links 44, 46, 58, 60 and terminates at node E1.

Figure 8:
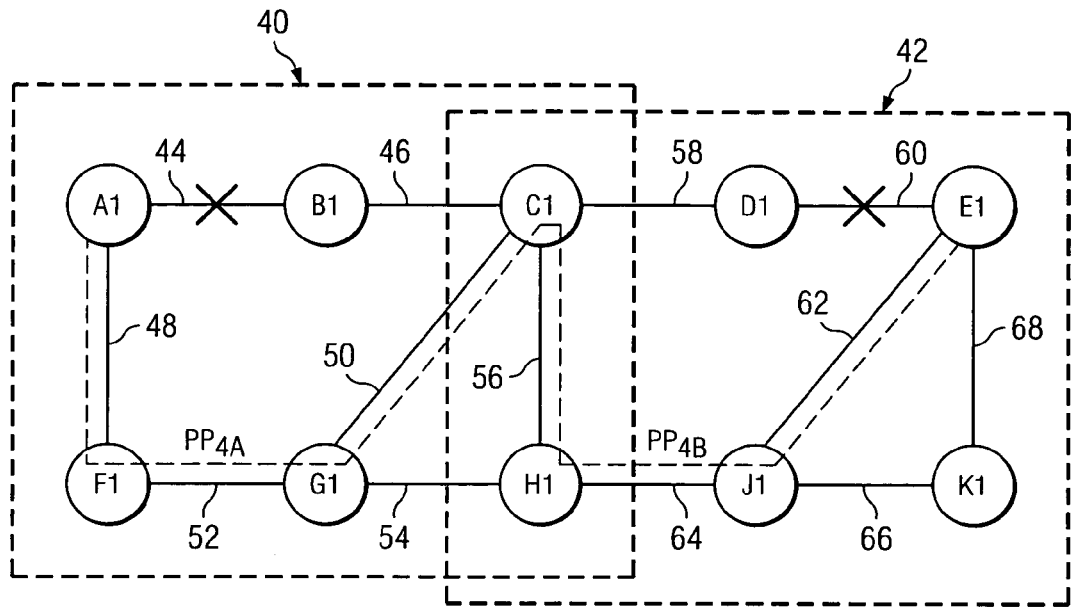
FIG. 8 shows the network of FIG. 7 reconfigured with protection paths to handle link failures in two areas.

As noted, it is preferable to define a protection path within each area. Thus, as shown in FIG. 8, protection path $PP_{4A}$, which starts at node A1, traverses nodes F1, G1 and links 48, 52, 50 and terminates at node C1, provides protection against a failure event, e.g., failed link 44, for working path $WP_4$ in area 40. Likewise, protection path $PP_{4B}$, which starts at node C1, traverses nodes H1, J1 and links 56, 64, 62 and terminates at node E1, provides protection against a failure event, e.g., failed link 60 for working path $WP_4$ in area 42. Note that the termination of protection path $PP_{4A}$ in node C1 is connected to the start of protection path $PP_{4B}$.

Figure 9:
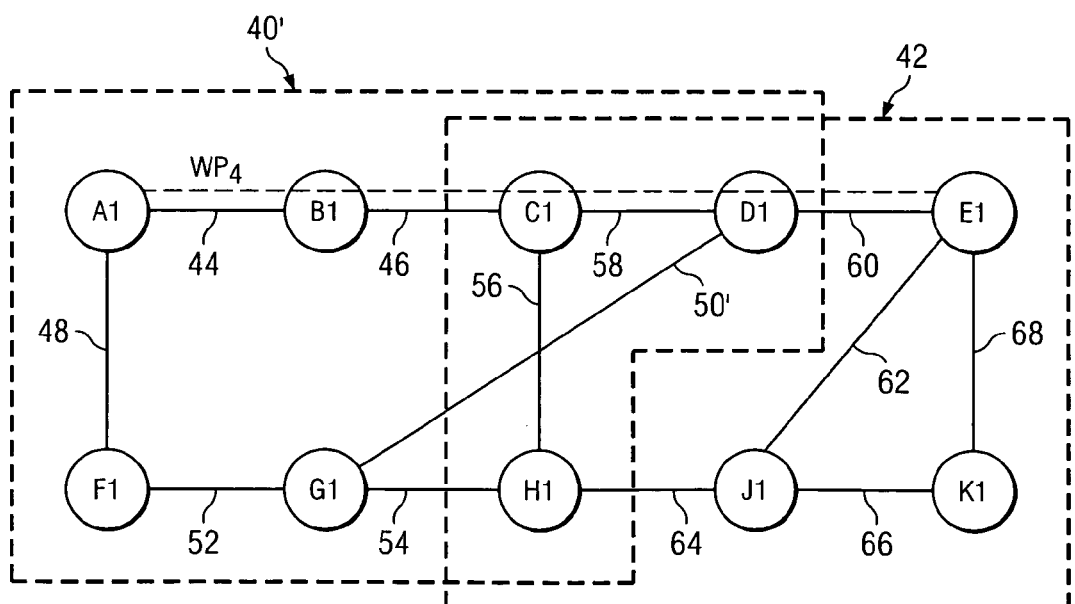
FIG. 9 shows another network node arrangement using overlapping areas.
Figure 10:
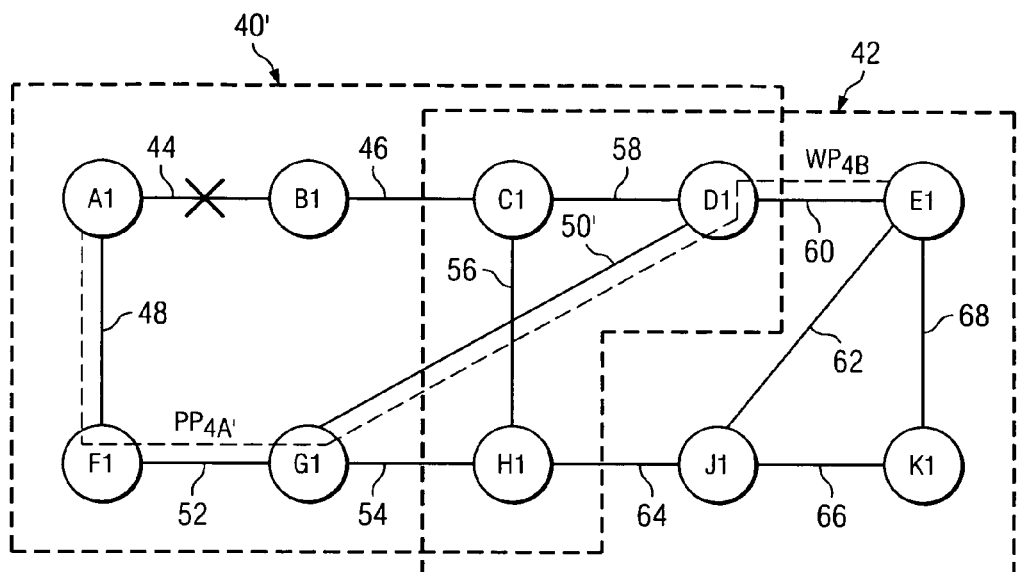
FIG. 10 shows the network of FIG. 9 reconfigured with a protection path to handle a link failure in one of the two areas.
Figure 11:
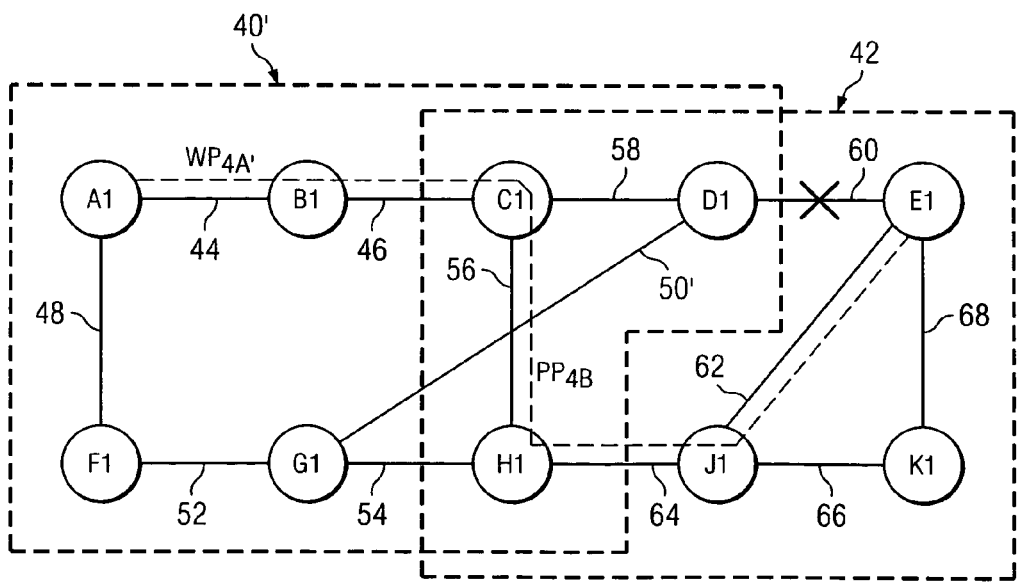
FIG. 11 shows the network of FIG. 9 reconfigured with a protection path to handle a link failure in the other of the two areas.

Referring now to FIGS. 9–11, another network arrangement is shown which includes two overlapping node areas 40' and 42. Node area 40' includes nodes A1, B1, C1, D1, F1, G1 and H1. Node area 42 includes nodes C1, D1, E1, H1, J1 and K1 as described in the example shown in FIGS. 7 and 8. In this example, the overlap occurs such that nodes C1, D1 and H1 and links 56, 58 are fully included in both areas.

A protection path $PP_{4A'}$, which starts at node A1, traverses node F1, G1 and links 48, 52, 50' and terminates at node D1, provides protection against a failure event, e.g., failed link 44, for working path $WP_4$ in area 40' as shown in FIG. 10. Note that the termination of protection path $PP_{4A'}$ in node D1 is connected to working path segment $WP_{4B}$ which represents that portion of working path $WP_4$ in area 42.

Likewise, protection path $PP_{4B}$, which starts at node C1, traverses nodes H1, J1 and links 56, 64, 62 and terminates at node E1, provides protection against a failure event, e.g., failed link 60, for working path $WP_4$ in area 42 as shown in FIG. 11. Note that the start of protection path $PP_{4B}$ in node C1 is connected to working path segment $WP_{4A}$ which represents that portion of working path $WP_4$ in area 40'. Also note that link 58 connecting nodes C1 and D1 belongs to both areas 40', 42. A failure of link 58 is protected by one of the two protection paths $PP_{4A'}$, $PP_{4B}$.

From the preceding description, it should be understood that the network arrangement shown in FIGS. 7 and 8 provides protection against double link failures, one in each area. However, such an arrangement cannot protect against a failure in node C1. The network arrangement in FIGS. 9–11 provides protection against a single failure in either area and is resilient to failure of node C1.

While only one protection path is associated with a particular working path per area for the particular embodiment described herein above, it should be understood that in other embodiments, there can be multiple protection paths per area that are associated with a working path.

A broadcast algorithm for fast failure notification and protection switching according to the present invention is now described. The broadcast algorithm is intended for use in link failure notification. A circuit management service responsible for managing the pair of working/protection paths can handle such matters as revertive or non-revertive restoration by using other signaling mechanisms.

The broadcast notification has two aspects: notification within a node and broadcast messaging between nodes.

The dissemination of failure notification messages within the node has three key characteristics:
1) multicast transmission to a selected set of node elements over a pair of redundant message buses;
2) two levels of non-preemptive priority, with the maximum message length being limited to ensure small delays for the high priority messages; and
3) reliable transmission using a retransmission protocol described herein below.

As described above, each network switching node includes one or more line cards for terminating a particular communications link to another node. A link failure is detected by one or both of the line cards which terminate the failed link. The line card uses a message bus within the node to notify other elements of the node with a high priority multicast message. These other node elements, described above, include:
1. The other line cards processors, which then disseminate the broadcast inside the appropriate network area(s), using the fast (line layer) SONET data communication channel (DCC);
2. The fabric controller card 106 (FIG. 6A), which activates the protection switchover mechanism described further herein; and
3. The system controller card (FIG. 6A), which performs a high level cleanup and alarming.

Note that in case of a line card processor failure, the system controller sends the message on its behalf. If the system controller fails, an alternate controller takes over.

The format of the broadcast message is shown in the following table:

| Version = 1 | Type | Failure Counter |
|---|---|---|
| Node ID$_{high}$ | | Node ID$_{mid}$ |
| Node ID$_{low}$ | | Link ID |

The first two bytes identify the protocol ID. The next two bytes are used to indicate a failure counter. The following six bytes are used to indicate the node ID. The identification of the failed link is provided by the remaining two bytes.

The broadcast of failure notification messages between nodes is now described. In the preferred embodiment, the line cards send and receive broadcast messages over the SONET DCC. The line cards have local information available to determine if the broadcast is about an already known failure or about a new failure, and whether the link is in their local area. In the case of a known failure, the broadcast is extinguished. If the line card determines that the link failure is a new failure, the same process for disseminating the message over the message bus occurs. Note that a fiber cable cut can result in several (almost simultaneous) broadcasts, one per affected optical wavelength or color.

To ensure extinction of the broadcast, the broadcast messages are numbered with a "failure counter". The counter value can be modulo 2 (a single bit), although it is preferable to number the counter values modulo 255, reserving 0XFF. In the latter case, the comparison can be done in arithmetic modulo 255. That is, numbers in [i−127, i−1] mod 255 are "less that i" and those in [i+1, i+127] mod 255 are "greater than i". The failure counter can be either line card specific or node specific. The trade-off is between table size (larger for line card counters) and complexity (race condition: two simultaneous failures inside a node must have distinct numbers). The following describes the case of a single network area. Description of the multi-area case follows.

When a line card receives an update originating at a link L, the line card compares a previously stored failure counter value for link L with the value in the broadcast message. The line card discards the message if the values match or if the value in the broadcast message is less than the previously stored value. If there is not a match, the line card updates the stored failure counter value and propagates the message.

Broadcasts must occur only in the network area(s) of the failed link. There are several ways to limit the broadcast including:

1. Selective broadcast at the receiving line card

On reception, a line card only multicasts the message to the correct outgoing line cards.

2. Selective discard at the transmitting line card

A line card broadcasts the message throughout the node, but the outgoing line cards only forwards the message within the correct areas. Note that since the outgoing line cards may want to look at the failure counter in the message in order not to send a duplicate, the extra processing associated with this option is not significant.

3. Selective discard at the receiving line card

The message is broadcast on all line cards; however, on reception a line card checks that it belongs to the proper area, discarding the message if necessary. Note that discarded messages must still be acknowledged per the transmission protocol described below.

To disseminate detailed information about links, a protocol such as the Open Shortest Path First (OSPF) routing protocol can be used (J. Moy, "OSPF Version 2", RFC2328, April 1998). Since OSPF propagation is independent of the broadcast protocol of the present invention, it may not be in synch with the broadcast information. To remedy this problem, the OSPF messaging can include the latest failure counter sent by each link. When receiving an OSPF message, the system controller will compare failure counters (in the modulo 255 sense) in the message with those values stored locally. If the OSPF message appears to be late, the information contained therein is discarded. OSPF includes a mechanism (time out) to determine that a node has become disconnected. When such an event occurs, the system controller will set the failure counters associated with all links of disconnected nodes to the reserved value (0XFF) in an internal table and in the tables of the line cards in the node. Reliance on the OSPF timeout simplifies the broadcast protocol. It should be understood that other routing protocols, such as private network-to-network interface (PNNI), can also be used.

A protocol for reliable transmission of the broadcast failure notification messages is now described. SONET links are normally very reliable, but the network must still be able to deal with errors in the broadcast. The present system employs the standard protocol known as LAPD (link access protocol—D channel) which is specified in ITU Recommendation Q.921. In LAPD, data transmission can either occur in one of two formats: Information (I) frames (numbered & with reliable ARQ) or Unnumbered Information (UI) frames (unnumbered and without reliable ARQ). The I frames are only numbered modulo 8, which is not good enough for the broadcast mechanism as there could easily be more than 7 short frames outstanding on a link.

Figure 12:
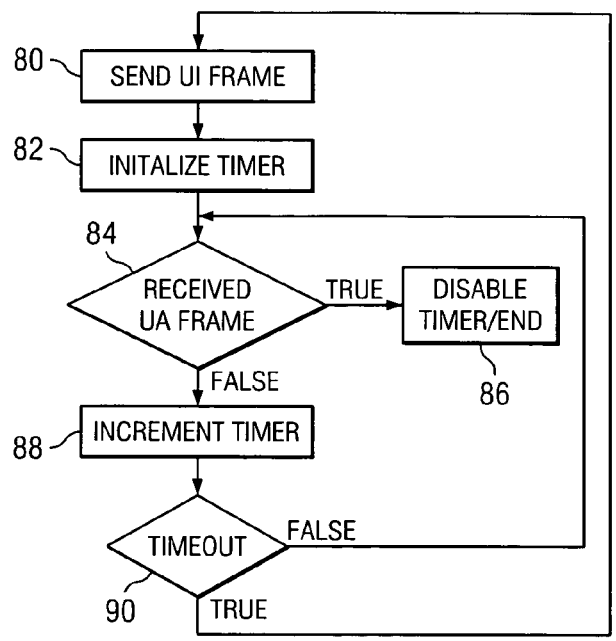
FIG. 12 illustrates a flow diagram of a reliable transmission protocol.

A reliable transmission protocol is made possible by using the unnumbered mode of LAPD and taking advantage of the fact that the failure message format provides for messages that are already numbered. The protocol can be understood with reference to the flow diagram of FIG. 12. A line card sends a broadcast message in a UI frame at block 80 and initializes a timer at block 82. It is preferable to have a timer in the line card dedicated to each link in the network. A node receiving a UI frame replies with a UA frame containing the same information as contained in the UI frame. If the line card receives such a UA frame at block 84, the timer is disabled at block 86. If no UA frame is received at block 84, then the timer is incremented at block 88 and the line card checks for time out of the timer at block 90. On time out, the line card retransmits the broadcast message at block 80. The time out can be less than the link round trip delay, but in that case retransmitted messages can have lower priority. The number of retransmissions is specific to the network implementation. The link is declared down upon lack of acknowledgment.

Note that the LAPD protocol adds 6 bytes (reusing the closing flag as an opening flag) to the failure message format, so that the overall length of the message is 18 bytes (before possible bit stuffing).

The same basic retransmission algorithm without LAPD formatting can be used to provide reliable transmission on the message bus inside a node as described herein above.

Figure 13A:
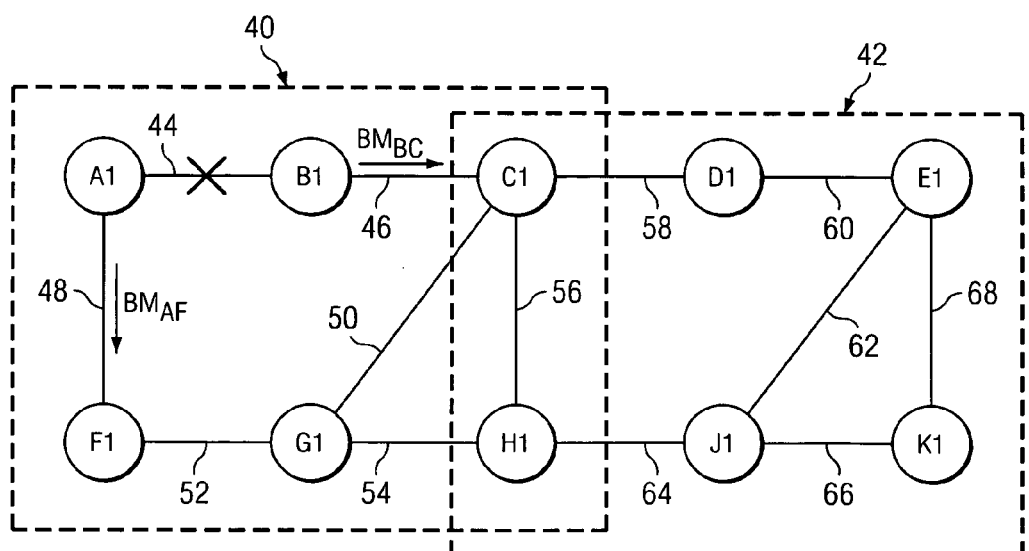
FIGS. 13A–13C illustrate the broadcast algorithm in the network of FIG. 7.

Having described aspects of the broadcast algorithm of the present invention, an example of the broadcast algorithm is now described with reference to FIGS. 13A–13C. In FIG. 13A, a failure is shown having occurred in communications link 44 which spans nodes A1 and B1. The respective line cards of nodes A1 and B1 which terminate the link 44 detect the failure. Upon such detection, a failure message is formatted by the detecting line cards and multicast over the message bus of the respective node in accordance with the procedures described herein above. In this example, each of the nodes A1 and B1 happens to only have one additional link, namely link 48 from node A1 to node F1 and link 46 from node B1 to node C1. Accordingly, a broadcast message $BM_{AF}$ is sent from node A1 to node F1 and a broadcast message $BM_{BC}$ is sent from node B1 to node C1 by the respective line cards.

Figure 13B:
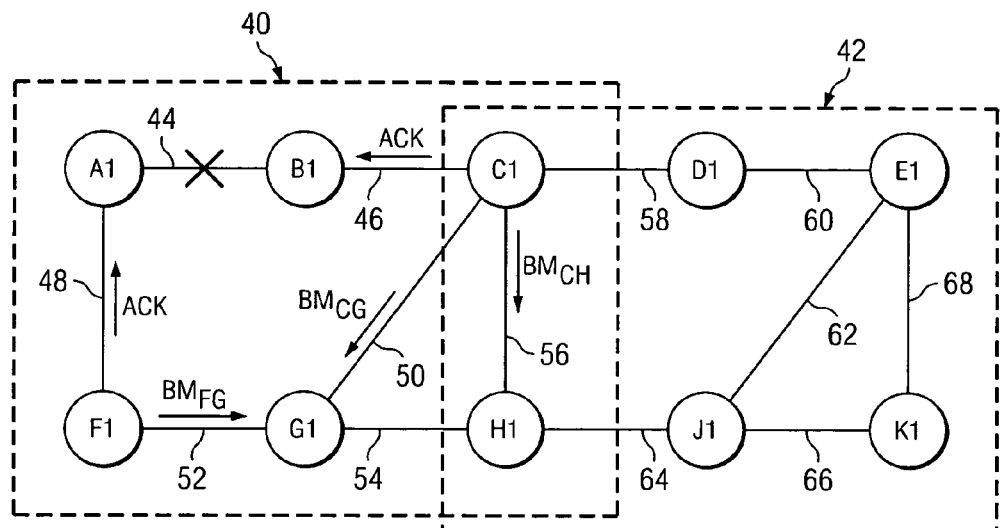
Figure 13C:
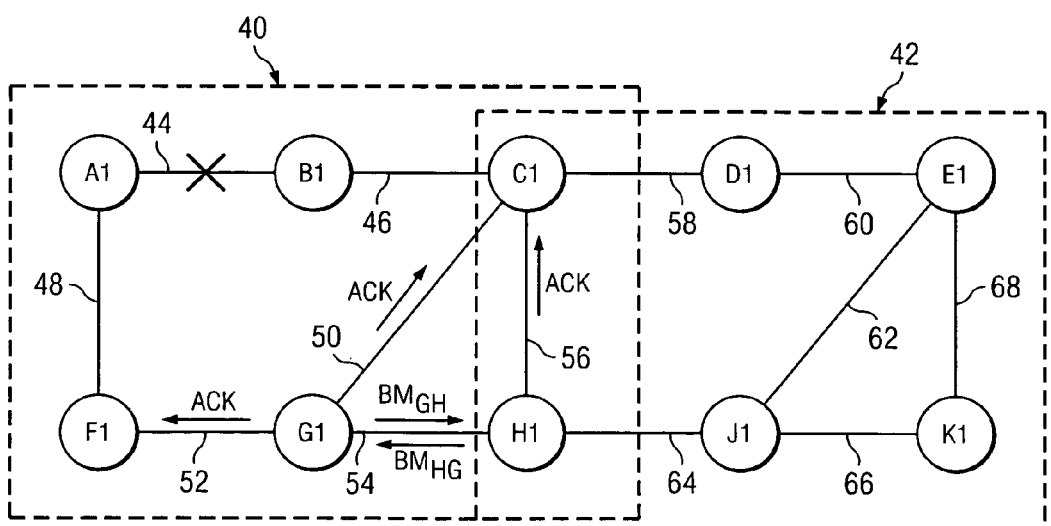

At nodes C1 and F1, reception of the respective broadcast messages $BM_{AF}$, $BM_{BC}$ are acknowledged as shown in FIG. 13B. The failure message is further multicast on the message bus of each of nodes C1 and F1 to other line cards within these nodes. Node C1 has three additional links, namely link 50 to node G1, link 56 to node H1 and link 58 to node D1. Since link 58 terminates outside area 40, node C1 only sends a broadcast message $BM_{CG}$ to node G1 and a broadcast message $BM_{CH}$ to node H1. Node F1 has only one additional link, namely link 52 to node G1. Accordingly, node F1 sends a broadcast message $BM_{FG}$ to node G1.

Node G1 receives two broadcast messages $BM_{FG}$ and $BM_{CG}$ and will extinguish whichever message is received later in accordance with the procedure for extinction described herein above. Both messages are also acknowledged as shown in FIG. 13C. Node G1 multicasts the message on its message bus to all of its line cards. The only remaining link at node G1 is link 54. Accordingly, node G1 sends a broadcast message $BM_{GH}$ to node H1. It should be noted that it is possible for node G1 to also send a broadcast message to either node F1 or node C1 depending on the timing and order of message receipt from those nodes.

Node H1 acknowledges reception of message $BM_{CH}$ and multicasts the message on its message bus. Since link 64 terminates outside area 40, node H1 only sends a broadcast message $BM_{HG}$ to node G1 on link 54. Nodes G1 and H1 each will acknowledge and extinguish the respective messages $BM_{HG}$ and $BM_{GH}$ since such messages will contain the same failure counter value as previously received in messages $BM_{CG}$ and $BM_{CH}$ respectively.

Protection Path Switchover Mechanism

Having described the aspects of the invention relating to broadcast failure notification, the switchover mechanism for activating protection paths is now described. The goal of the path protection switchover mechanism is to terminate traffic which was using paths affected by a failure, and to activate the new paths that allow the traffic to once again flow through the switching node. In the process, it may be necessary to terminate lower priority, preemptable traffic that had been using the paths that were designated as the protection paths. The operations are time-critical, and somewhat, computationally intense.

To provide for fast processing of an activation request, several linked list structures are used. While the following describes single-linked lists, it should be understood that double-linked lists can also be implemented. Three kinds of linked lists are maintained:

1) To avoid briefly oversubscribing output links at nodes where the working and protection paths merge (e.g., node H in FIG. 3), the working path output is disabled or "squelched" before enabling the protection path using a "squelch" list for each link in the local area.

Figure 14:
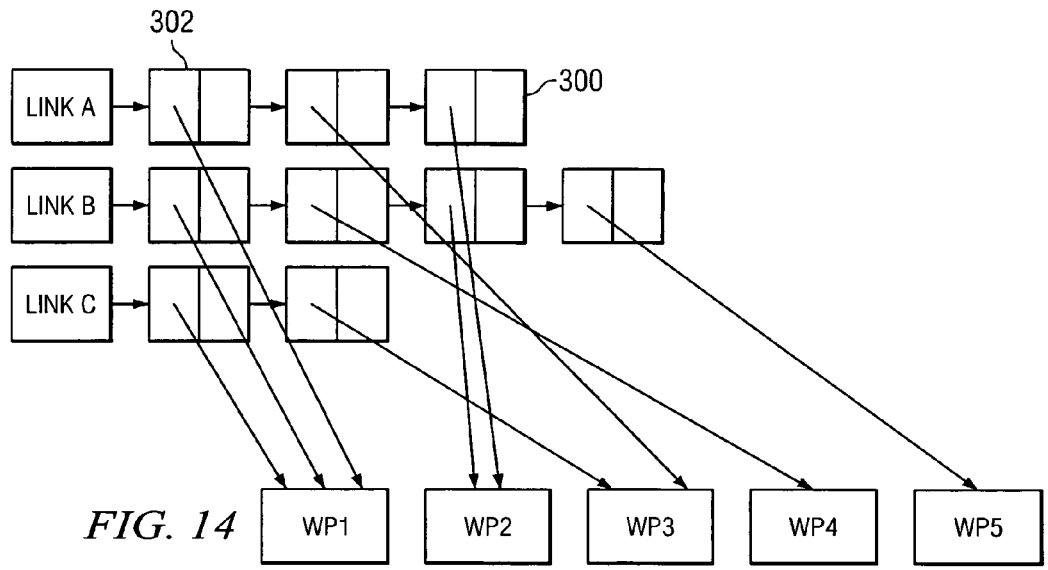
FIG. 14 is a schematic diagram illustrating the relationship between working paths and linked lists for the switchover mechanism.

2) For each network link in its local network area, the switching node maintains an "activate" list for protection paths that have a working path using that link (using the information carried in the path establishment messages described above). The relationship between the activation list for different links and working paths is illustrated in FIG. 14. As shown, working path WP1 has an entry 302 in the linked list 300 for each of links a, b and c. Working path WP2 has an entry in the linked list for links a and b. Similar observations can be made concerning working paths WP3, WP4 and WP5 as each working path traverses several links. As described further herein below, the activation list entries include commands for quickly activating the protection paths. The position of a path on any of the lists can be determined by the priority assignments noted herein above. Further, to avoid poor capacity utilization in case of multiple failures, if working path WP1 appears before working path WP2 at one node, it should appear before working path WP2 at all common nodes. Otherwise, it is possible for two protection paths that exhaust bandwidth on different links to prevent each other from being activated.

3) For each port, the switching node maintains a "drop" list of preemptable paths. The list entries include commands for quickly disabling the output flow. The position of a path on the list can be determined by a priority scheme.

When a switch learns through broadcast that a link has failed, commands driven by the path protection accelerator 122 (FIG. 6A) activate the protection paths on the corresponding list. As each path is activated, the associated bandwidth is subtracted from the available capacity for the corresponding link. If the available capacity on a link becomes negative, enough preemptable paths of lower priority than the path to be activated are dropped to make the capacity positive again. If the available capacity cannot be made positive, which should only happen for multiple major failures, an error message is sent from the node to a central management system.

The particular details of an embodiment for providing the path protection switchover mechanism are now given.

Figure 15:
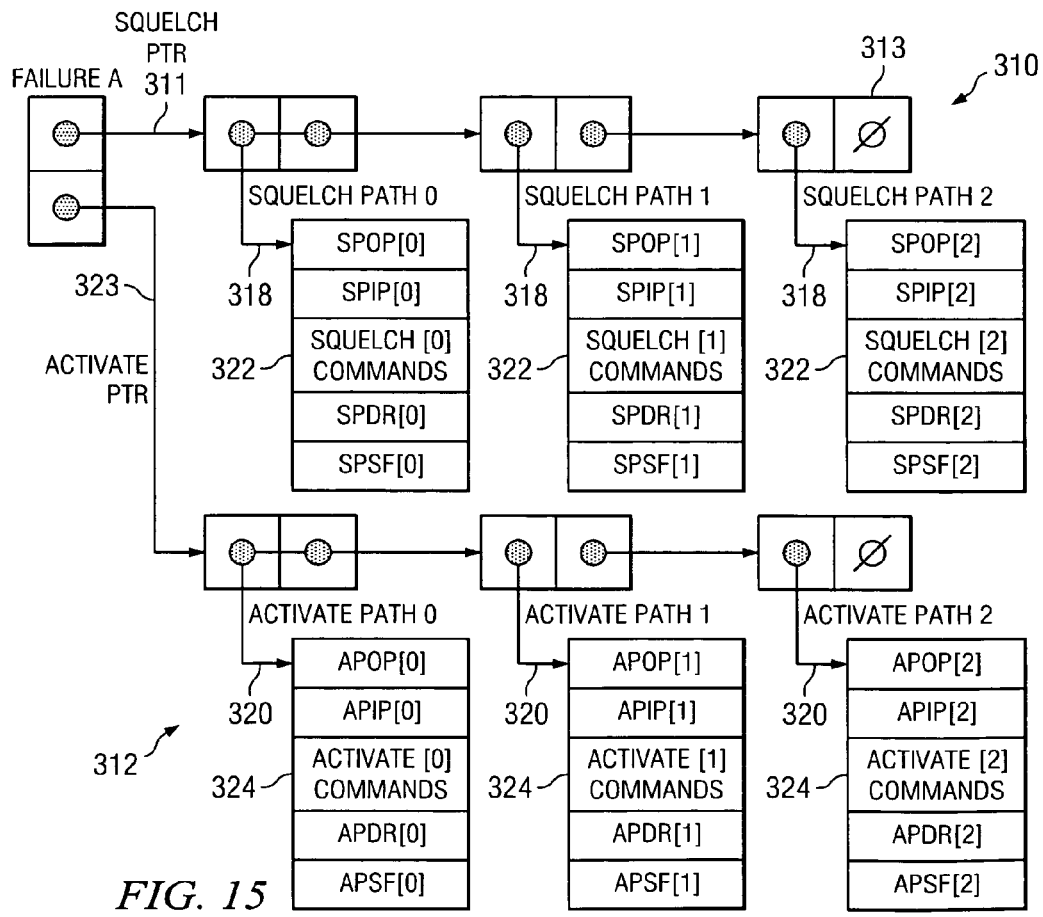
FIG. 15 is a schematic diagram illustrating an embodiment of linked lists for squelching and activating paths.

FIG. 15 illustrates two linked lists that are maintained by software in path protection memory 124 of the fabric controller card 106 (FIG. 6A). The first list is known as the squelch list 310. It represents those paths that should be disabled upon notification of a corresponding failure. The second list is the activate list 312, which lists those previously provisioned paths that should be activated to complete the switchover. There is one pair of lists for each possible failure that is protected by a predetermined path (only one list pair is shown in FIG. 15). Each list contains a series of paths 318, 320 respectively, with each path in the lists containing data structures 322, that include an input port number, output port number, a list of fabric switch commands, a data rate for that path, and status. The input and output port numbers identify physical ports in the fabric which correspond to the input and output of the path, respectively.

In addition to the squelch and activate lists shown in FIG. 15, software also keeps a table 330 with two entries per port as shown in FIG. 16. The first entry 332 is the port capacity, which is updated each time software adds or deletes a connection using that output port. It represents the current working utilization as an absolute number. The second entry 334 is a pointer to the head of a drop list 336 for that output port. The drop list 336 is a linked list of preemptable traffic paths which hardware is allowed to disable to free-up output port capacity for a protection switchover. The drop list 336 has a format 338 similar to that of the squelch list 310 and the activate list 312, although the output port field points only to itself in this case.

The output port capacity table 330 and the drop list 336 are organized as adjacent entries 350, 352 for each of the 128 output ports of the system as shown in the table structure of FIG. 17.

An example of the path protection switchover mechanism is now described. Upon notification that there has been a failure from which to recover, the initial action is to "walk" the squelch list. These paths are already considered broken, but the switching node does not know it, and they are still consuming switch bandwidth and cell buffers. The squelch function first invalidates the VPI/VCI mapping, which causes the switch to discard these cells at the output port. Next, it adds the output flow to the reset queue of the scheduler. Using FIG. 15 as an example, assume that Failure A has been identified. Software sets the squelch pointer 311 to the head of the list containing Paths denoted SP[0], SP[1], and SP[2]. The path protection accelerator 122 (FIG. 6A) reads the SP[0] structure from memory, and executes the squelch commands, which consist of CPU port writes to the MSC2 and PFS chips (208A–208D, 216A–216D in FIG. 6B) that control the output port for that path. It also looks-up the port capacity for the output port and modifies it, adding the data rate (SPDR[n]) of the path being disabled. Path status (SPSF[n]) is updated to reflect the newly squelched state. The process is repeated for paths SP[1] and SP[2]. After updating the SP[2] structure, the nil pointer 313 indicates the end of the squelch list 310.

The next step is to walk the activate list 312, which in this example contains three paths AP[0], AP[1], and AP[2]. As with the squelch pointer, software sets the activate pointer 323 to the head of the list containing AP[0:2]. For each path in the active list it may or may not be possible to perform the activation without freeing up additional capacity. Before activating a path, path protection accelerator 122 compares the current port capacity indexed by the output port in APOP[n] against the required path rate of the activation path found in APDR[n]. Assume for this example that paths AP[0] and AP[2] do not need extra capacity freed.

Using the output port in APOP[0] as an index into the capacity table 330, path protection accelerator 122 finds that this capacity is already greater than that required by APDR[0], meaning it is safe to activate protection path AP[0]. The switch commands are executed, consisting of CPU port writes to the particular MSC1 chips (204A–204D in FIG. 6B) controlling the input translation for that path and the corresponding PFS chips (216A–216D in FIG. 6B) controlling the scheduling. In this case, the proper MSC 1 to access must be supplied as part of the switch commands. Since there are more paths on the activate list, the path protection accelerator 122 moves on to AP[1]. For this path the comparison of the capacity table entry indexed by APOP[1] shows that APDR[1] is greater, meaning there is not enough output port capacity to completely activate the protection path. More output port bandwidth must be freed by removing low-priority output traffic.

Path protection accelerator 122 uses APOP[1] to point to the head of the appropriate drop list 336. The process of dropping lower priority output traffic is similar to the squelch process, except that the drop list is only traversed as far as necessary, until the capacity of that output port exceeds APDR[1]. As when squelching broken paths, each dropped path status DPSF[port,m] is updated along the way to reflect its deactivation and its data rate DPDR[port,m] is added to the capacity for APOP[1]. If the path protection accelerator 122 reaches the end of the drop list and APDR[1] still exceeds the newly computed capacity of the output port APOP[1], the attempted protection switchover has failed and is terminated. Assuming that activation of AP[1] was successful, path protection accelerator 122 repeats the process for AP[2], after which it reaches the end of the activate list, indicating the successful completion of the switchover. The network management system may subsequently reroute or restore the paths that have been dropped.

The data structures that have been referred to above in connection with the squelch, activate and drop lists are now described.

The Path Output Port (POP) is a 7-bit number, ranging from 0 to 127, which represents the range of line card ports, per the MMC numbering convention used in the fabric.

The Path Input Port (PIP) is a 7-bit number, ranging from 0 to 127, which represents the range of line card ports, per the MMC numbering convention used in the fabric.

The Path Data Rate (PDR) represents the data rate where all 0's indicates zero data rate. Each increment represents a bandwidth increment.

The Path Status Flags (PSF) reflect the state of a path that can be, or has been, squelched, dropped, or activated. States can include the following bits:
Working
Protecting
Failed
Dropped
Squelched The Switch Commands give the hardware directions about the exact operations it must perform at the CPU interface to the Control Module (MSC1 and PFS). For purposes of the switchover mechanism, the following accesses are required:
writes to the Input Translation Table (ITT) via the MSC1 controlling the input port (activate)
writes to the Output Translation Table (OTT) via the MSC2 controlling the output port (squelch, drop)
writes to the Scheduler External Memory (SEM) via the PFS controlling the output port (squelch, drop)

In order to derive the command structure for the protection switchover, it helps to understand the mechanism used by the MMC chip set to access internal fabric registers and tables. The data structures that must be managed are the Output Translation Table (OTT), which is a captive memory accessed only by the MSC2; the Scheduler External Memory, associated with the PFS; and the Input Translation Table (ITT), attached to the MSC 1. None of these memories can be accessed directly by software (or non-MMC hardware). The MSC1 and PFS, which are the only devices that have CPU ports, provide an indirect access mechanism through registers that are accessible from the respective CPU ports. The MMC chips control the accesses using their internal switch cycle and chip-to-chip communication paths.

For path squelch and path drop operations, the first access required is a modification of the OTT. This is done using the Write MSC Tables command in the MSC1, which requires multiple writes to the General Purpose Registers (R0–R8) followed by a write to the Command Register (CMR). Four (4) 16-bit writes are needed, plus the write for the CMR. The address in the OTT must be determined by software and is a function of the Connection ID (CID). All other values are fixed and can be supplied by hardware.

The second operation for path squelching and dropping is to put a flow on the Reset Queue, by accessing the Scheduler External Memory attached to the output PFS, which has its own CPU interface, Command Register, and General Purpose Registers (G0–G2). Two (2) 16-bit writes are needed, plus the write of the CMR. The Output Flow ID and Scheduler Address must be supplied by software. The other values are fixed and can be supplied by hardware.

The third hardware-assisted access into the Control Module involves modifying an Input Translation Table (ITT) entry via the MSC1 associated with the input port. This access is used to activate the protection path, and it is similar to the one used to squelch a path. Five (5) 16-bit writes are required, plus the write of the CMR. The values in R0–R4 must be supplied by software. Hardware can supply the CMR value.

Software builds the linked lists of path structures in the memory 124 attached to the path protection accelerator 122 which is implemented as an FPGA (FIG. 6A). Each structure must be aligned to a 16-byte boundary. The path data structures for activate, squelch and drop operations include a path status which uses at least three (3) bits:

[0]=path is in use, i.e. working
[1]=path is reserved for protection
[2]=path activation failed An algorithm for the switchover mechanism is described in the following pseudo-code, written from the point-of-view of memory operations. Synchronization requirements relative to the other FCC and to the MMC switch cycle are not shown.

```
Initiate:     CPU_write (Next Squelch Pointer,
              CPU Data Input Register)
              CPU_write (Next Activate Pointer,
              CPU Data Input Register)
              Goto Squel_Strt
Squel_Strt:   if (Next Squelch Pointer == nil) goto Actv_Strt
              mem_read (Next Squelch Pointer)
                  reg_save (Current Squelch Pointer)
                  reg_save (Next Squelch Pointer)
              mem_read (Current Squelch Pointer)
                  reg_save (Squelch Path Flags)
                  reg_save (Squelch Output Port)
                  reg_save (Squelch Path Rate)
                  reg_save (Switch Parameter 0)
              if (Squelch Path Flags == Not_Working) goto Squel_Strt
              mem_read (Capacity Table [Squelch Output Port])
                  reg_save (Output Path Capacity)
              mem_read (Current Squelch Pointer)
                  reg_save (Switch Parameters 1:0)
              do_squelch (Squelch Output Port, Switch Parameters 2:0)
              update_flags (Squelch Path Flags to Not_Working)
              add (Output Path Capacity, Squelch Path Rate)
                  reg_save (Output Path Capacity)
              mem_write (Capacity Table [Squelch Output Port], Output Port Capacity)
              mem_write (Current Squelch Pointer, Squelch Path Flags)
              Goto Squel_Strt
Actv_Strt:    if (Next Activate Pointer == nil) Goto Complete
              mem_read (Next Activate Pointer)
                  reg_save (Current Activate Pointer)
                  reg_save (Next Activate Pointer)
              mem_read (Current Activate Pointer)
                  reg_save (Activate Path Flags)
                  reg_save (Activate Output Port)
                  reg_save (Activate Path Rate)
                  reg_save (Activate Input Port)
              if (Activate Path Flags == Is_Protecting) goto Actv_Strt
              mem_read (Capacity Table [Activate Output Port])
                  reg_save (Output Path Capacity)
                  reg_save (Next Activate Pointer)
Compare:      if (Output Path Capacity >= Activate Path Rate) goto Actv_Path
Drop_Strt:    if (Next Drop Pointer == nil) goto Actv_Path
              mem_read (Next Drop Pointer)
                  reg_save (Current Drop Pointer)
                  reg_save (Next Drop Pointer)
              mem_read (Current Drop Pointer)
                  reg_save (Drop Path Flags)
                  reg_save (Drop Output Port)
                  reg_save (Drop Path Rate)
                  reg_save (Switch Parameter 0)
              if (Drop Path Flags == Not_Working) goto Drop_Strt
              mem_read (Current Drop Pointer)
                  reg_save (Switch Parameters 1:0)
              do_squelch (Drop Output Port, Switch Parameters 2:0)
              update_flags (Drop Path Flags to Not_Working)
              add (Output Path Capacity, Drop Path Rate)
                  reg_save (Output Path Capacity)
              mem_write (Current Drop Pointer, Drop Path Flags)
              Goto Compare
Actv_Path:    if (Output Path Capacity < Activate Path Rate) goto Fail
              mem_read (Current Activate Pointer)
                  reg_save (Switch Parameters 3:0)
              mem_read (Current Activate Pointer)
                  reg_save (Switch Parameters 4)
              do_activate (Activate Input Port, Switch Parameters 3:0)
              update_flags (Activate Path Flags to Is_Protecting)
              subtract (Output Port Capacity, Activate Path Rate)
                  reg_save (Output Port Capacity)
              mem_write (Capacity Table [Activate Output Port], Output Port Capacity)
              mem_write (Current Activate Pointer, Activate Path Flags)
              Goto Actv_Strt
Fail:         update_flags (Activate Path Flags to Add_Failed)
              mem_write (Current Activate Pointer, Activate Path Flags)
Complete:     Set status bit, and interrupt if enabled
```

The pseudo-code disclosed herein above provides a framework for the protection hardware, and allows bookkeeping of the memory operations that are required.

While this invention has been particularly shown and described with references to preferred embodiments thereof, it will be understood by those skilled in the art that various changes in form and details may be made therein without departing from the spirit and scope of the invention as defined by the appended claims. It will be apparent to those of ordinary skill in the art that methods involved in the present invention may be embodied in a computer program product that includes a computer usable medium. For example, such a computer usable medium can include a readable memory device, such as a hard drive device, a CD-ROM, a DVD-ROM, or a computer diskette, having computer readable program code segments stored thereon. The computer readable medium can also include a communications or transmission medium, such as a bus or a communications link, either optical, wired, or wireless, having program code segments carried thereon as digital or analog data signals.

What is claimed is:

1. A method of path protection in a network of nodes interconnected by communications links, each link having a capacity for carrying logical channels between nodes, the method comprising:

establishing a plurality of working paths through the nodes, each working path comprising logical channels of a series of links;

for each working path, precalculating an associated protection path comprising logical channels of a different series of links;

assigning a priority to each working path and associated protection path;
upon a failure event involving at least one of the links, switching the working paths that include the at least one failed link to their respective protection paths, with a higher priority protection path preempting one or more lower priority paths that share at least one link if the link capacity of the at least one shared link is otherwise exceeded by addition of the preempting protection path.

2. The method of claim 1 wherein the higher priority protection paths preempt lower priority protection paths that share at least one link.

3. The method of claim 1 wherein the higher priority protection paths preempt lower priority working paths that share at least one link.

4. The method of claim 1 wherein precalculating an associated protection path includes assigning an associated protection path bandwidth as a percentage of a working path bandwidth associated with the corresponding working path.

5. The method of claim 1 wherein the network comprises at least two overlapping areas of nodes and wherein establishing includes establishing a working path which traverses one or more areas of nodes and precalculating includes precalculating an associated protection path for each area through which the working path traverses; and upon a failure event involving the working path, switching a portion of the working path to the associated protection path for one of the areas that includes the failure event.

6. A method of failure notification in a communications network, the method comprising:
providing a communication network having at least two overlapping areas of nodes interconnected by communications links;
upon a failure event involving one of the communications links, broadcasting a failure message identifying the failed link, the broadcast being confined within the areas which includes the failed link, and wherein broadcasting includes detecting the link failure at one or both of the nodes connected to the failed link, identifying nodes connected to the one or both detecting nodes that belong to the same areas as the failed link and sending the failure message only to such identified nodes, and wherein the broadcast failure message includes a failure counter associated with the failed link;
at each node that detects the link failure, updating the failure counter for the failed link and inserting the updated failure counter value into the broadcast failure message; and
at each node that receives the broadcast failure message, comparing a stored failure counter value for the failed link with the updated failure counter value in the received broadcast failure message and, if the updated failure counter value is less than or equal to the stored failure counter value, discarding the broadcast failure message; otherwise replacing the stored failure counter value with the updated failure counter value and identifying nodes connected thereto which belong to the same areas as the failed link and sending the failure message only to such identified nodes.

7. The method of claim 6 further comprising synchronizing the failure message with a routing protocol message by including the updated failure counter in the routing protocol message.

8. The method of claim 7 further comprising at each node that receives the routing protocol message, comparing a stored failure counter value for the failed link with the updated failure counter value in the received routing protocol message to determine whether the routing protocol message is synchronized with the broadcast failure message and discarding the routing protocol message if not synchronized.

9. In a network of nodes interconnected by communications links, apparatus at a node comprising:
a message bus;
plural line cards interconnected to the message bus, each line card including a message bus interface circuit for sending and receiving messages on the bus, the messages comprising high and low priority messages having a message length that is bounded such that latency on the message bus is bounded; and
wherein each line card includes an interface port for terminating a communications link to another node, the port having means for detecting a failure event involving the associated link, and wherein in response to such failure detection, a detecting line card sends a failure message at high priority on the message bus to other line cards.

10. In a network of nodes interconnected by communications links, a method of protection path switching comprising:
establishing a plurality of working paths, each working path including a working path connection between ports of a switch fabric in each node of a series of interconnected nodes;
at each node:
maintaining a protection path activation list for each communications link in the network, each list comprising an ordered listing of path entries, each path entry associated with a particular working path for that communications link and including at least one path activation command for effecting activation of a protection path connection between ports of the switch fabric;
upon a failure of one of the communications links, sequentially implementing the at least one path activation command for each of the path entries of the particular protection path activation list associated with the failed link.

11. The method of claim 10 further comprising at each node;
maintaining a working path deactivation list for each communications link in the network, each list comprising an ordered listing of path entries, each path entry associated with a particular working path for that communications link and including at least one path deactivation command for effecting deactivation of one of the working path connections between ports of the switch fabric;
upon the failure of one of the communications links, sequentially implementing the at least one path deactivation command for each of the path entries of the particular working path deactivation list associated with the failed link prior to implementing the at least one path activation command of the corresponding protection path activation list.

12. The method of claim 10 further comprising at each node:
specifying a path data rate and the particular input and output ports for the protection path connection in each path entry of the path protection lists;
monitoring available capacity of each switch fabric output port;

maintaining a drop list for each switch fabric output port, each drop list comprising an ordered listing of path entries, each path entry including at least one path deactivation command for effecting deactivation of a path connection using that switch fabric output port;

wherein sequentially implementing the at least one path activation command includes comparing the path data rate with the monitored available capacity for the corresponding switch fabric output port; if the protection path data rate is greater than the available port capacity, sequentially implementing the at least one path deactivation command for path entries of the drop list until either the drop list terminates or the available port capacity exceeds the path data rate.

13. In a network of nodes interconnected by communications links and having a plurality of working paths, each working path including a working path connection between ports of a switch fabric in each node of a series of interconnected nodes, apparatus in a node for protection path switching, the apparatus comprising:

a memory;

a protection path activation list stored in the memory for each communications link in the network, each list comprising an ordered listing of path entries, each path entry associated with a particular working path for that communications link and including at least one path activation command for effecting activation of a protection path connection between ports of the switch fabric;

a path protection accelerator for retrieving the protection path activation list from the memory and sequentially implementing, upon a failure of one of the communications links, the at least one path activation command for each of the path entries of the particular protection path activation list associated with the failed link.

14. The apparatus of claim 13 further comprising:

a working path deactivation list stored in the memory for each communications link in the network, each list comprising an ordered listing of path entries, each path entry associated with a particular working path for that communications link and including at least one path deactivation command for effecting deactivation of one of the working path connections between ports of the switch fabric;

wherein the path protection accelerator is operable to retrieve the working path deactivation list from the memory upon the failure of one of the communications links, and sequentially implement the at least one path deactivation command for each of the path entries of the particular working path deactivation list associated with the failed link prior to implementing the at least one path activation command of the corresponding protection path activation list.

15. A method of failure notification in a communications network, the method comprising:

providing a communication network having at least two overlapping areas of nodes interconnected by communications links;

upon a failure event involving one of the communications links, broadcasting a failure message identifying the failed link, the broadcast being confined within the areas which includes the failed link; and wherein the broadcasting step includes at one or more of the nodes, sending to a connected node a LAPD protocol unnumbered information frame containing the failure message and resending the failure message in another unnumbered information frame after a time interval unless an unnumbered acknowledgement frame containing the failure message is received form the connected node.

16. A method of failure notification in a communications network, the method comprising:

providing a communication network having at least two overlapping areas of nodes interconnected by communications links;

upon a failure event involving one of the communications links, broadcasting a failure message identifying the failed link, the broadcast being confined within the areas which includes the failed link; and wherein the broadcasting step includes at one or more of the nodes, sending to a connected node a LAPD protocol unnumbered information frame containing the failure message and periodically resending the failure message until an unnumbered acknowledgment frame containing the failure message is received from the connected node.

17. A method of failure notification in a communications network, the method comprising:

providing a communication network having at least two overlapping areas of nodes interconnected by communications links;

upon a failure event involving one of the communications links, broadcasting a failure message identifying the failed link, the broadcast being confined within the areas which includes the failed link;

wherein each node includes plural line cards, each line card terminating a link to another node; and wherein the broadcasting step includes detecting the link failure at one of the line cards connected to the failed link; sending a failure message to the other line cards on a message bus within the node of the detecting line card; at each of the other line cards, sending the failure message to the associated connected node.

18. The method of claim 17 wherein sending at the detecting line card includes multicasting the failure message and periodically resending the failure message until an acknowledgment message is received from each of the other line cards.

19. The method of claim 17 wherein the message bus carries high and low priority messages and wherein sending at the detecting line card includes sending the failure message at high priority.

* * * * *